(12) United States Patent
Ye et al.

(10) Patent No.: US 12,388,521 B2
(45) Date of Patent: Aug. 12, 2025

(54) REPEATED UPLINK TRANSMISSIONS IN AN NTN

(71) Applicant: APPLE INC., Cupertino, CA (US)

(72) Inventors: Chunxuan Ye, San Diego, CA (US); Dawei Zhang, Cupertino, CA (US); Haitong Sun, Cupertino, CA (US); Hong He, Cupertino, CA (US); Huaning Niu, Cupertino, CA (US); Oghenekome Oteri, San Diego, CA (US); Seyed Ali Akbar Fakoorian, San Diego, CA (US); Sigen Ye, San Diego, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,397

(22) PCT Filed: Sep. 2, 2021

(86) PCT No.: PCT/CN2021/116275
§ 371 (c)(1),
(2) Date: Sep. 17, 2021

(87) PCT Pub. No.: WO2023/028956
PCT Pub. Date: Mar. 9, 2023

(65) Prior Publication Data
US 2024/0031010 A1 Jan. 25, 2024

(51) Int. Cl.
*H04B 7/185* (2006.01)
*H04L 1/18* (2023.01)

(52) U.S. Cl.
CPC ..... *H04B 7/18513* (2013.01); *H04B 7/18539* (2013.01); *H04L 1/18* (2013.01)

(58) Field of Classification Search
CPC .... H04B 7/18513; H04B 7/18539; H04L 1/18
(Continued)

(56) References Cited

U.S. PATENT DOCUMENTS 7,558,229 B2 * 7/2009 Bachl ................ H04L 1/1887
455/433
2007/0036168 A1 * 2/2007 Hsiao ................ H04L 47/2441
370/412

(Continued)

FOREIGN PATENT DOCUMENTS

CN 111602365 A 8/2020
CN 112534919 A 3/2021

(Continued)

OTHER PUBLICATIONS

Moderator (Sharp), "FL Summary on Enhancements on PUSCH repetition type A", R1-21xxxxx, 3GPP TSG-RAN WG1 #105-e, e-Meeting, Agenda Item 8.8.1.1, May 10-27, 2021, 33 pages.

(Continued)

*Primary Examiner* — Faruk Hamza
*Assistant Examiner* — Jean F Voltaire
(74) *Attorney, Agent, or Firm* — Dorsey & Whitney LLP

(57) ABSTRACT

Indicating a transmission gap at a user equipment (UE) in a non-terrestrial network (NTN) may include decoding a physical uplink shared channel (PUSCH) aggregation factor associated with a distance to a serving satellite in the NTN. A transmission gap information communication may be decoded. The transmission gap information communication may include at least information associated with a PUSCH transmission gap and a maximum number of repetitions before the PUSCH transmission gap. Uplink (UL) PUSCH transmissions equal to the maximum number of repetitions may be encoded before occurrence of PUSCH transmission gap.

17 Claims, 20 Drawing Sheets

(58) Field of Classification Search
USPC .......................................................... 370/316
See application file for complete search history.

(56) References Cited

U.S. PATENT DOCUMENTS

| | | |
|---|---|---|
| 2020/0052827 A1 | 2/2020 | Vilaipornsawai et al. |
| 2020/0274656 A1 | 8/2020 | Gordaychik |
| 2021/0051707 A1 | 2/2021 | Rastegardoost et al. |
| 2022/0052779 A1* | 2/2022 | Ye .......................... H04W 72/23 |
| 2022/0116967 A1* | 4/2022 | Yeo ................... H04W 72/1268 |
| 2022/0201631 A1* | 6/2022 | Wu .................... H04W 56/0005 |
| 2022/0232503 A1* | 7/2022 | Cheng ............... H04W 56/0045 |

FOREIGN PATENT DOCUMENTS

| | | |
|---|---|---|
| CN | 113169819 A | 7/2021 |
| WO | 2020065617 A1 | 4/2020 |
| WO | 2020231831 A1 | 11/2020 |
| WO | 2021161272 A1 | 8/2021 |

OTHER PUBLICATIONS

PCT/CN2021/116275, International Search Report and Written Opinion, Apr. 25, 2022, 9 pages.

\* cited by examiner

REPEATED UPLINK TRANSMISSIONS IN AN NTN

TECHNICAL FIELD

This application relates generally to wireless communication systems, including transmission gap operations related to non-terrestrial networks (NTNs).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
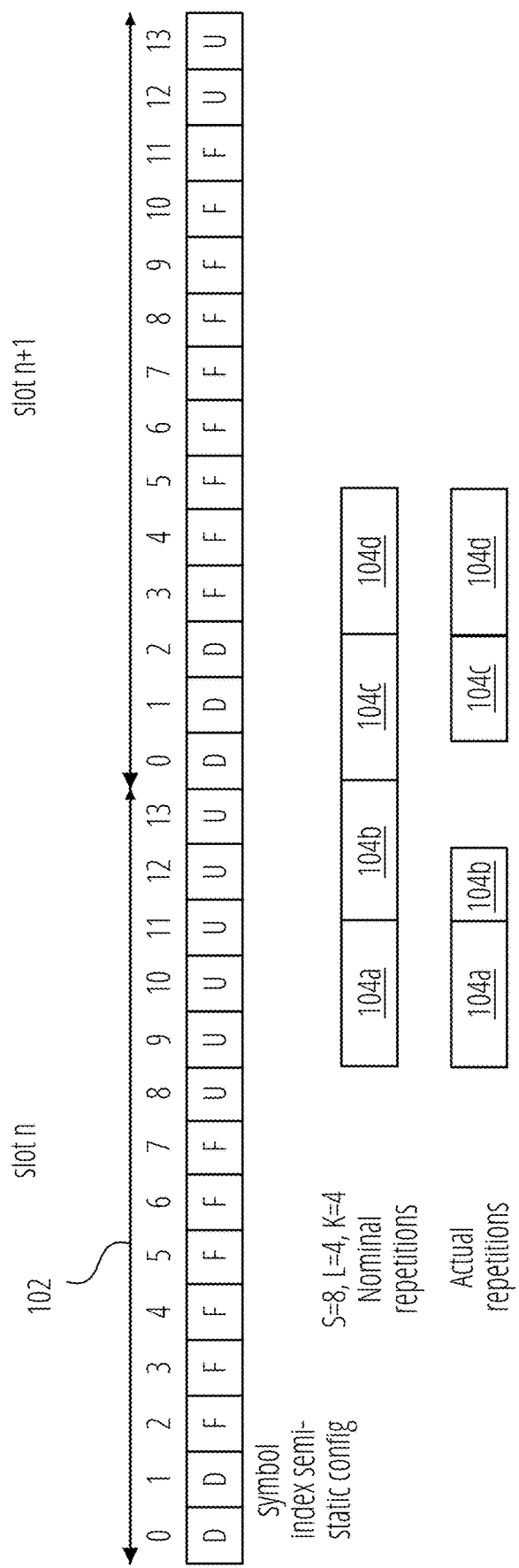
FIG. 1 illustrates a chart and repetitions associated with PUSCH Type B repetitions and transmission gaps in accordance with one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, physical uplink shared channel (PUSCH) repetition type B may include the following characteristics: 1. Support for mini slots; and 2. Support for PUSCH repetitions in one slot or across multiple consecutive slots, which may further include: a. Support for both dynamic grant (DG) and configured grant (CG) (i.e., both Type 1 and Type 2); b. Support for being scheduled by DCI format 0_1 and DCI format 0_2 (not DCI format 0_0); c. Support for time domain resource allocation (TDRA), which is defined by S (starting symbol), L (length of each nominal repetition) and K (number of nominal repetitions). In particular, a TDRA field in DCI or type 1 CG configuration indicates one of the entries in TDRA table, which provides the values for S, L and K; d. The PUSCH transmission occurring within the time window of L*K symbols, starting from the indicated starting symbol, including: i. Each nominal repetition potentially being segmented into one or more actual repetitions depending on slot boundaries and uplink (UL)/downlink (DL) directions of the symbols. In particular, if a "nominal" repetition crosses the slot boundary or DL/UL switching point, the "nominal" repetition may be split into multiple PUSCH repetitions having one PUSCH repetition in each UL period in a slot; e. No demodulation reference signal (DMRS) sharing across multiple repetitions; f. Support for PUSCH mapping type B only; and g. Transport block size (TBS) being determined based on L; 3. Support for mini-slot repetition within a slot or across slots; 4. Support for segmentation when one nominal allocation crosses a slot boundary or crosses DL symbols/unavailable symbols; 5. Supports orphan symbols, including: a. When L=1 is signaled for PUSCH repetition type B, not treating an actual repetition with a single symbol as an orphan symbol; and b. When L>1 is signaled for PUSCH repetition type B, dropping an actual repetition with a single symbol (i.e., an orphan symbol). An actual repetition with a single symbol may carry purely DMRS overhead for direct Fourier transform-spread-orthogonal frequency division multiplexing (DFT-s-OFDM), or large DMRS overhead for cyclic prefix-OFDM (CP-OFDM); and 6. Redundancy version (RV) determinations that follow the 3GPP Release 15 (Rel-15) principle for both dynamic grant (DG) and configured grant (CG). In addition, RV cycling may be performed across actual repetitions. Furthermore, for DG, the RV of the 1st actual repetition is indicated by DCI, followed by RV cycling through {0, 2, 3, 1}. Similarly, for CG, the RV cycling sequence follows repK-RV in configuredGrantConfig, where the first actual repetition uses the first value in repK-RV.

FIG. 1 illustrates a chart 102 related to a symbol index and semi-static configuration associated with PUSCH Type B. In addition, FIG. 1 includes four nominal repetitions in the form of UL data transmission 104a, UL data transmission 104b, UL data transmission 104c, and UL data transmission 104d. The actual repetitions of such UL data transmission repetitions illustrates that the nominal repetitions may not actually occur in quite the time frame as a nominal repetition may represent (this principle is further described with respect to FIG. 10, FIG. 11, FIG. 12A, and FIG. 12B.

Furthermore, a Timing Advance (TA) applied by an NR non-terrestrial network (NTN) UE in RRC_IDLE/INACTIVE mode and RRC_CONNECTED mode may be given by: $T_{TA}=(N_{TA}+N_{TA,UE\text{-}specific}+N_{TA,common}+N_{TA,offset})\times T_C$, where $N_{TA}$ is defined as 0 for physical random access channel (PRACH) and updated based on a TA command field in Message 2 (Msg2)/Message B (MsgB) (i.e., associated with 4-step and 2-step RACH procedure steps, respectively) and the medium access control (MAC) control element (CE) TA command; $N_{TA,UE\text{-}specific}$ comprises a UE self-estimated TA to pre-compensate for a service link delay; $N_{TA,common}$ comprises network-controlled common TA, and may include a timing offset considered by the network; $N_{TA,common}$ with a value of 0 is supported; and $N_{TA,offset}$ comprises a fixed offset used to calculate the TA. Notably, a UE may not assume that a round trip time (RTT) between the UE and the gNB is equal to the calculated TA for Message 1 (Msg1)/Message A (Msg A) (i.e., associated with 4-step and 2-step RACH procedure steps, respectively). $N_{TA,common}$ may also comprise a common timing offset X as agreed in RAN1 #103-e.

Additionally, enhancement(s) related to aggregated transmission (including repetition) being prioritized have to be made to improve the performance in NTN. Coverage enhancements for smart phone operation in NTN may be particularly useful, at least partially because UE antenna gain (e.g., −5 dBi) may be small due to its form factor.

Figure 2:
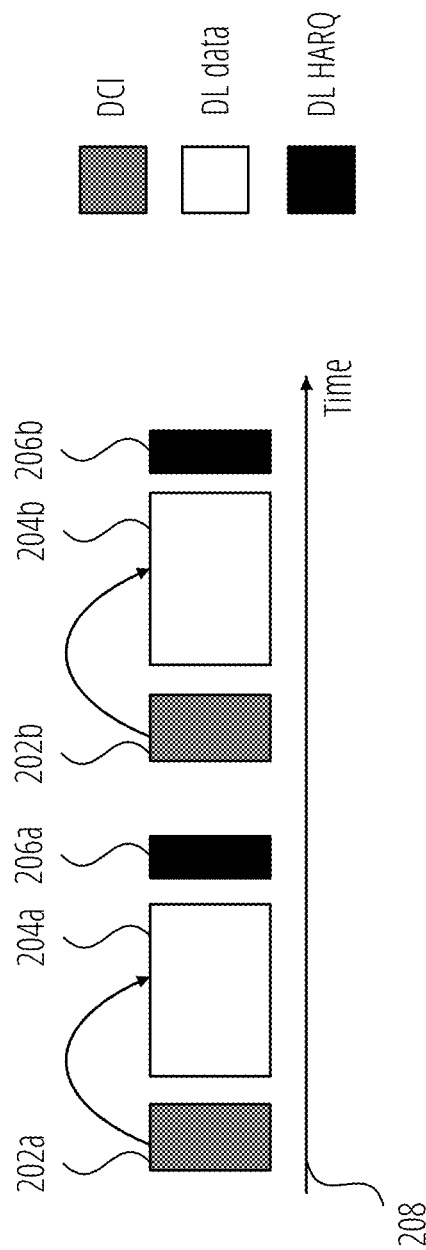
FIG. 2 illustrates an example of a legacy hybrid automatic repeat request (HARQ) retransmission in accordance with one embodiment.

FIG. 2 illustrates an example of a legacy hybrid automatic repeat request (HARQ) retransmission. As shown, legacy HARQ retransmissions may include a timeline 208 having a first transmission including each of a downlink control information 202a (DCI 202a), DL data 204a, and a DL HARQ 206a, as well as a second transmission (i.e., retransmission) that includes a DCI 202b, DL data 204b, and a DL HARQ 206b.

Figure 3:
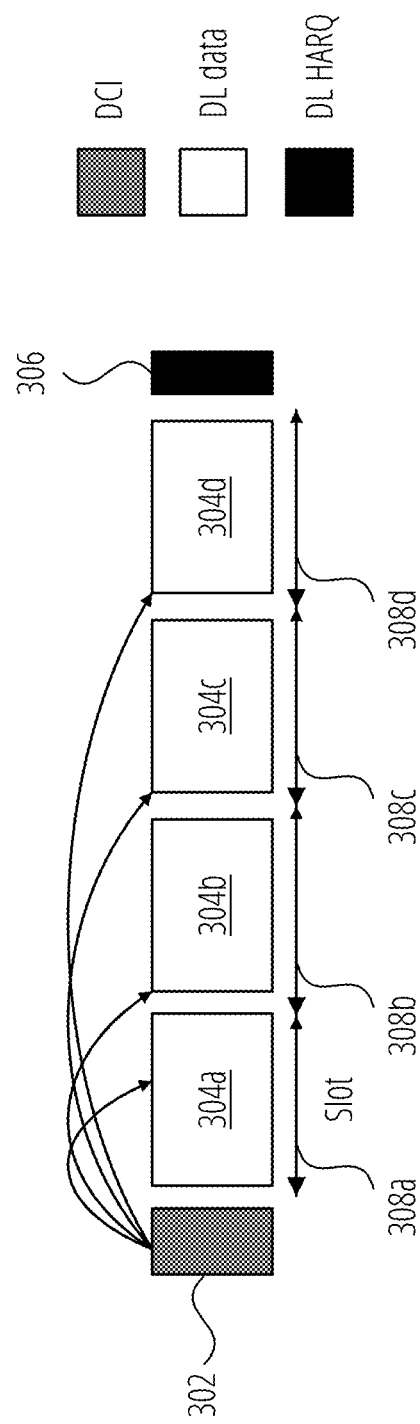
FIG. 3 illustrates an example of a legacy aggregated retransmission with HARQ feedback in accordance with one embodiment.

FIG. 3 illustrates an example of a legacy aggregated retransmission with HARQ feedback. As shown, legacy aggregated retransmissions with HARQ feedback may include a single DCI 302, four transmissions/re-transmissions of DL data (i.e., DL data transmission 304a through DL data transmission 304d) that each correspond to a slot (i.e., slot 308a through slot 308d) during which transmission/retransmission occurs, and a DL HARQ 306. Accordingly, a slot group (i.e., slot 308a through slot 308d) with consecutive slots may be utilized to transmit and re-transmit the DL data. In addition, each such slot group may be associated with a range of HARQ process numbers.

Using current standards, if a large number of repetitions are applied in a UE's uplink (UL) transmission for coverage enhancement, the timing advance (TA) and frequency offset (FO) may change during the large number of repetitions, which may result in a few issues, including: 1. Whether the TA and frequency offset are to be updated; 2. Whether a transmission gap is to be utilized; and 3. How to indicate the transmission gap, if applicable.

Figure 4:
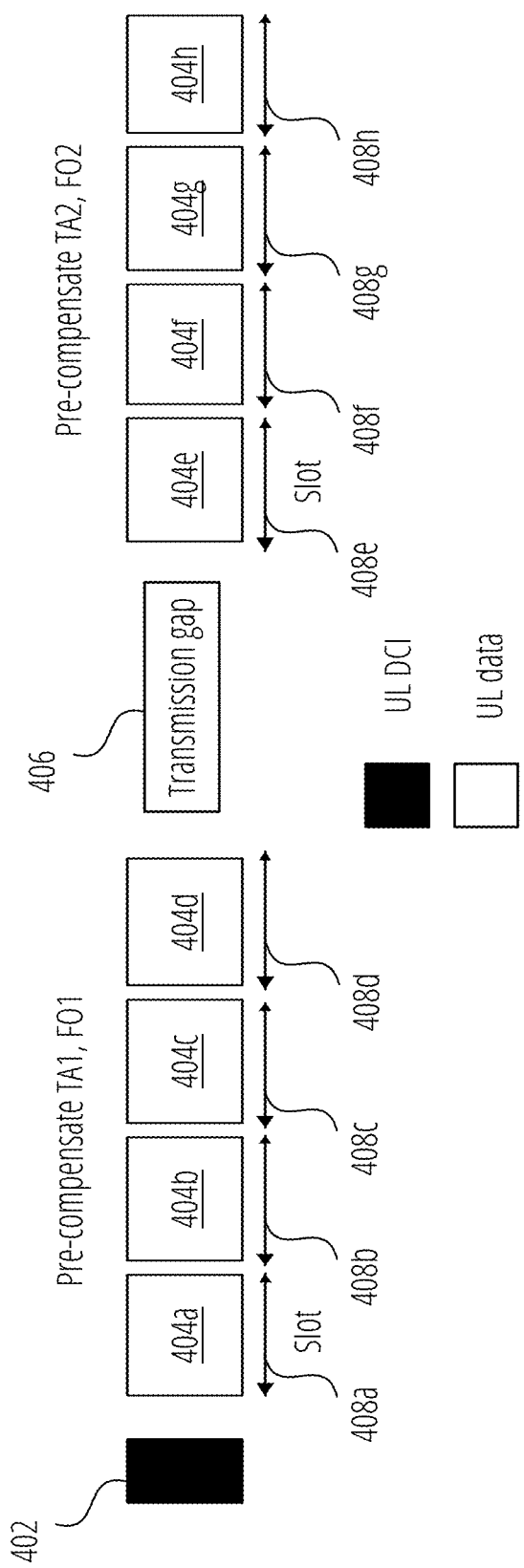
FIG. 4 illustrates an example of a large number of repetitions being applied to a UL transmission in accordance with one embodiment.

FIG. 4 illustrates an example of such a situation (i.e., a large number of repetitions being applied to a UE's UL transmission). As shown, FIG. 4 includes a UL grant DCI 402 and eight UL data transmissions/retransmissions (i.e., UL data transmission 404a through UL data transmission 404h). In addition, each of such transmissions may occur within a corresponding slot (i.e., slot 408a through slot 408h). A transmission gap 406 may then follow a portion of these transmissions/retransmissions (i.e., UL data transmission 404a through UL data transmission 404d), which transmission gap is followed a new set of retransmissions of the UL data (i.e., UL data transmission 404e through UL data transmission 404h). Notably, the first segment of transmissions occurring prior to the transmission gap 406 may have a first TA and a first FO and the second segment of transmissions occurring after the transmission gap may have a second TA and a second FO.

A first solution, which is related to indicating a transmission gap, may include various options. Prior to discussing the three options, it is noted that transmission gaps may start from the start of a slot or may end at the end of a slot.

In a first option related to indicating a transmission gap, transmission gaps may be dynamically indicated via DCI, which may include a PUSCH aggregation factor being semi-statically configured or dynamically indicated via TDRA. For instance, a UE may receive a K_offset value associated with a distance between a serving satellite and the UE (or a UE within the NTN that is furthest from the serving satellite) in an NTN.

mation block (SIB), radio resource control (RRC) configuration, or MAC CE. Such embodiments may include explicitly indicating the maximum number of repetitions before a transmission gap and/or the length of the transmission gap.

In a third option related to indicating a transmission gap, transmission gaps may be configured together with a TDRA table and indicated by DCI. For instance, in a first sub-option, a PUSCH configuration may include a TDRA table with extended fields such as a transmission gap and a number of maximum contiguous transmissions between gaps, as in Table 1 below.

TABLE 1

| TDRA index | $K_0$ | Mapping type | Start symbol | Repetition number | Transmission gap (slot) | Max contiguous Transmissions between gaps (slots) |
|---|---|---|---|---|---|---|
| 0 | | | | 4 | 1 | 3 |
| 1 | | | | 4 | 2 | 2 |
| 2 | | | | | | |
| 3 | | | | | | |

In addition, DCI may include one or more fields that may allow for indicating a transmission gap. Such DCI fields may allow for indicating a maximum number of repetitions between transmission gaps. For instance, such indication may be in a unit of slots (e.g., a maximum of four slots of repetitions), which may be referred to as Type A. Alternatively, such indication may be in a unit of repetitions (e.g., a maximum of four repetitions), which may be referred to as Type B. The DCI fields for indicating a transmission gap may also allow for indicating a length of a given transmission gap. For instance, such indication may be in a unit of slots (e.g., the transmission gap is one slot). Alternatively, such indication may be in a unit of repetitions (e.g., the transmission gap is equal to the duration of one repetition).

The units used for indicating a maximum number of repetitions or a length of a given transmission gap may be determined based on a PUSCH repetition type. For instance, the unit may comprise slots for PUSCH repetition type A while the unit may comprise repetitions for PUSCH repetition type B. Notably, however, these are just examples as either PUSCH repetition type may correspond to any particular type of unit.

Figure 5:
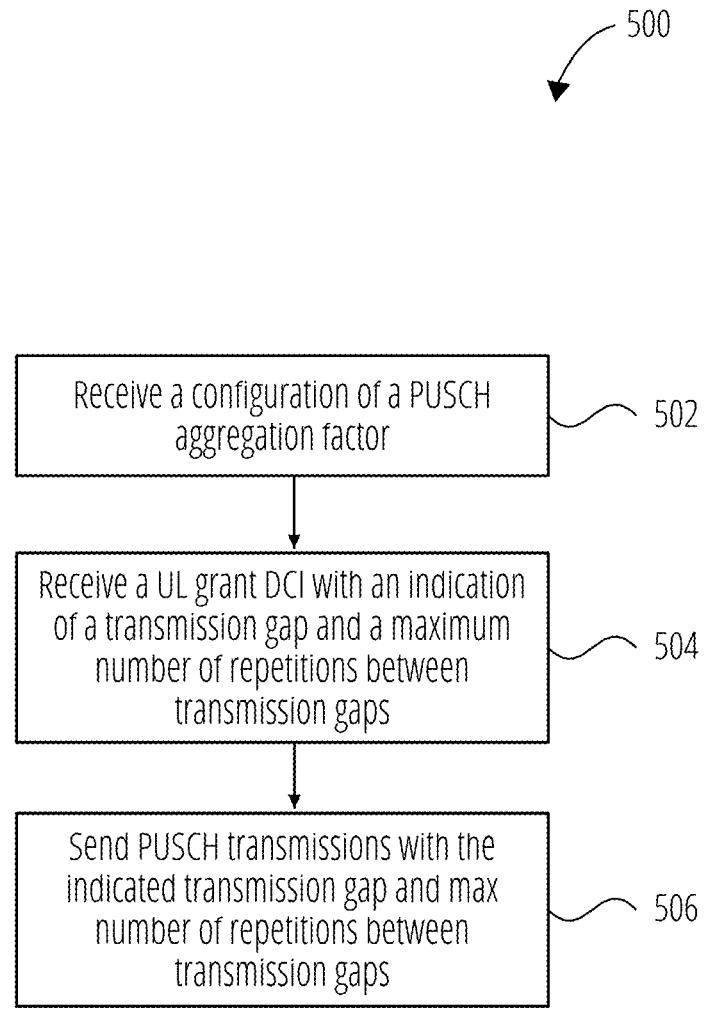
FIG. 5 illustrates a flowchart of a method for indicating a transmission gap. The block 502 includes receiving a configuration of a PUSCH aggregation factor in accordance with one embodiment.

FIG. 5 illustrates a flowchart of a method 500 for indicating a transmission gap. Notably, FIG. 5 is associated with the first option related to indicating a transmission gap further described above. In block 502, the method 500 includes receiving a configuration of a PUSCH aggregation factor. For instance, such aggregation factor may comprise a K_offset value and be dynamically indicated to a UE via TDRA. In block 504, the method 500 includes receiving a UL grant DCI with an indication of a transmission gap and a maximum number of repetitions between transmission gaps. For instance, the DCI may include one or more fields for indicating repetitions. In block 506, the method 500 includes sending PUSCH transmissions with the indicated transmission gap and maximum number of repetitions between transmission gaps. Accordingly, the UE may encode and send the number of PUSCH transmissions indicated in the UL grant DCI.

In a second option related to indicating a transmission gap, transmission gaps may be configured via system infor- Alternatively, a DCI field of the TDRA table may indicate the corresponding transmission gap and a number of maximum contiguous transmissions between transmission gaps.

In a fourth option related to indicating a transmission gap, the transmission gap may be pre-defined (e.g., 1 slot, 2 slots, 3 slots, and so forth). Such embodiments may be limited to a number of a maximum contiguous transmissions between gaps being configured or indicated.

Figure 6:
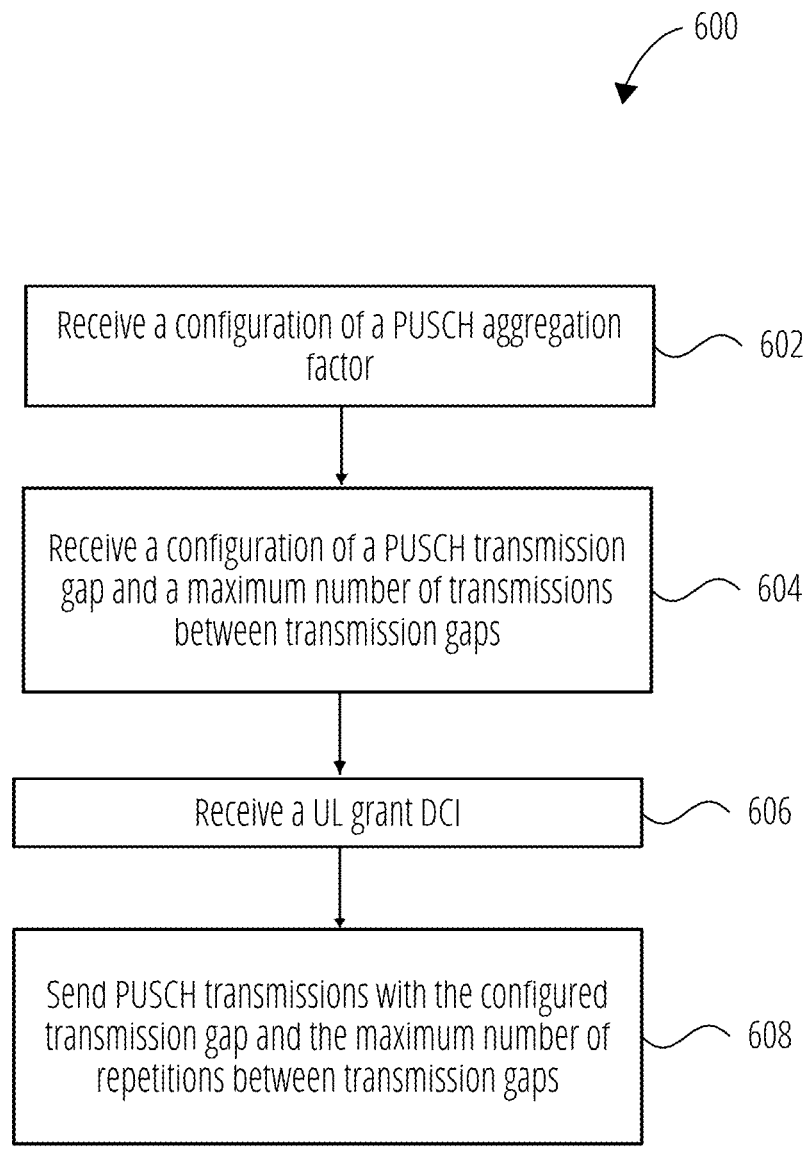
FIG. 6 illustrates a flowchart of a method for configuring transmission gaps associated with UL transmissions in accordance with one embodiment.

FIG. 6 illustrates a flowchart of a method 600 for configuring transmission gaps associated with UL transmissions. Notably, FIG. 6 is associated with the second and third options related to indicating a transmission gap further described above. In block 602, the method 600 includes receiving a configuration of a PUSCH aggregation factor. For instance, a UE may receive a K_offset value associated with a distance between a serving satellite and the UE (or a UE within the NTN that is furthest from the serving satellite) in an NTN. In block 604, the method 600 includes receiving the configuration of a PUSCH transmission gap and a maximum number of transmissions between transmission gaps. For instance, such configuration may include a TDRA table with fields indicating a length of the transmission gap and a maximum number of transmissions between transmission gaps. In block 606, the method 600 includes receiving a UL grant DCI and in block 608, the method 600 includes sending PUSCH transmissions with the configured transmission gap and the maximum number of repetitions between transmission gaps.

Figure 7:
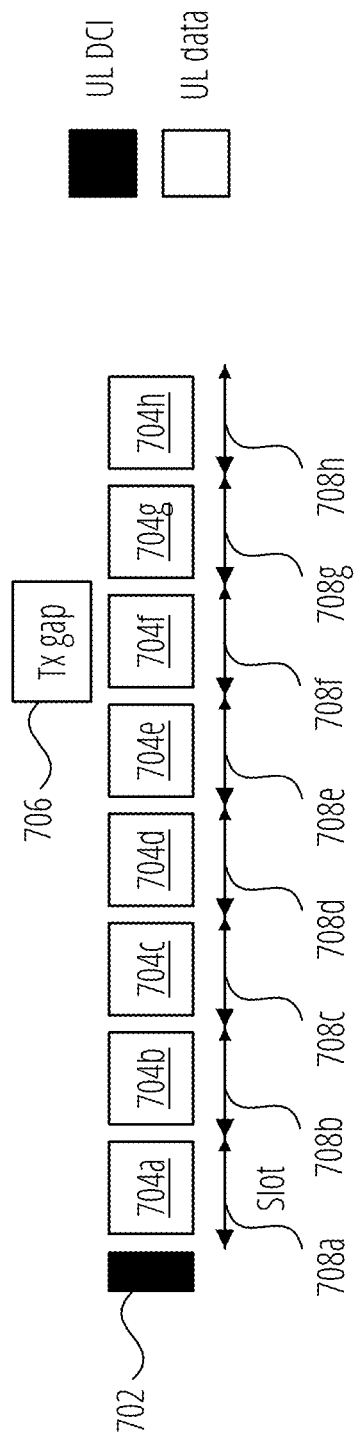
FIG. 7 illustrates an example of a transmission gap between a number of transmissions/retransmissions with respect to PUSCH repetition Type A in accordance with one embodiment.

A second solution, which is related to operation of a transmission gap with respect to PUSCH repetition Type A, may include various options. Accordingly, FIG. 7 illustrates a general example of a transmission gap between a number of transmissions/retransmissions with respect to PUSCH repetition Type A. As shown, FIG. 7 includes a UL grant DCI 702 followed by eight transmissions/retransmissions of UL data (i.e., UL data transmission 704a through UL data transmission 704h) that are each transmitted during a corresponding slot (i.e., slot 708a through slot 708h). In addition, FIG. 7 includes a transmission gap 706. Notably, FIG. 7 does not explicitly indicate how the transmission gap 706 is handled. However, FIG. 8 and FIG. 9 each illustrate a particular manner in which such a transmission gap may be handled.

In a first option related to the transmission gap operation with respect to PUSCH repetition Type A, a total number of repetitions may be maintained when using a transmission gap. In particular, if a total number of repetitions R is larger than max contiguous transmissions between gaps S, the total number of segments is given by ⌈R/S⌉. In such embodiments, first segments (i.e., the portion of transmissions before a transmission gap) may include S repetitions while a last segment (i.e., the portion of transmissions after a transmission gap) may include R−⌊R/S⌋·S repetitions.

In addition, various sub-options under the first option may be possible. In a first sub-option (Case 1), a redundancy version (RV) sequence may include continuity after a transmission gap. For example, assume R=8, S=5, and an RV sequence=[0 2 3 1 0] before the transmission gap. Using Case 1, the RV sequence=[2 3 1] after the transmission gap.

In a second sub-option (Case 2), an RV sequence may restart after a transmission gap. For example, assume R=8, S=5, and an RV sequence=[0 2 3 1 0] before the transmission gap. Using Case 2, the RV sequence=[0 2 3] after the transmission gap. The selection between Case 1 and Case 2 may be based on configuration.

Figure 8:
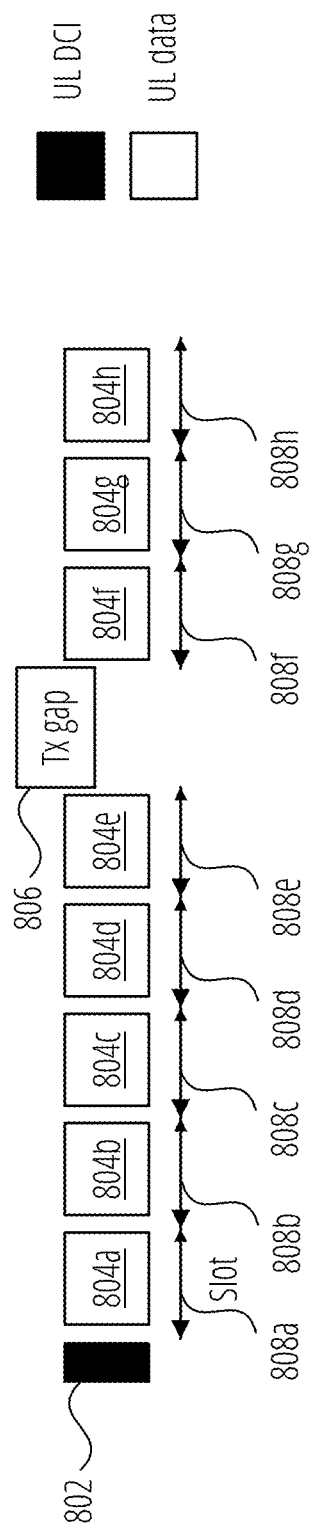
FIG. 8 illustrates an example of using a total number of repetitions when handling a transmission gap in accordance with one embodiment.

FIG. 8 illustrates the use of a total number of repetitions when handling a transmission gap. In particular, FIG. 8 corresponds to the first option related to transmission gap operation with respect to PUSCH repetition Type A discussed above (i.e., maintaining a total number of repetitions when utilizing a transmission gap). In particular, FIG. 8 may correspond to an example having eight repetitions of UL data transmissions (i.e., R=8) with a first segment having five repetitions (i.e., S=5). Accordingly, as shown, FIG. 8 includes a UL grant DCI 802 followed by five transmissions/retransmissions of UL data (i.e., UL data transmission 804a through UL data transmission 804e) that are each transmitted during a corresponding slot (i.e., slot 808a through slot 808e) in the first segment. After the first segment of five transmissions/retransmissions of UL data, a transmission gap 806 may be utilized. After the transmission gap, the remaining repetitions may be performed in the form of UL data transmission 804f through UL data transmission 804h. Accordingly, each repetition of UL data transmissions (i.e., eight in total) is performed, in addition to the transmission gap 806. Of course, either Case 1 or Case 2 of the first option may be utilized with respect to the example of FIG. 8.

In a second option related to transmission gap operation with respect to PUSCH repetition Type A, a total number of slots for repetition are maintained when using a transmission gap, which may include various sub-options. In a first sub-option (Case 1), RV sequence continuity may be utilized after a transmission gap. For example, if R=8, S=5, and an RV sequence=[0 2 3 1 0] before the transmission gap, the RV sequence=[2 3] after the transmission gap.

In a second sub-option (Case 2), an RV sequence may restart after a transmission gap. For example, if R=8, S=5, and an RV sequence=[0 2 3 1 0] before the transmission gap, the RV sequence=[0 2] after the transmission gap.

In a third sub-option (Case 3), an RV sequence may utilize non-continuity after a transmission gap. For example, if R=8, S=5, and an RV sequence=[0 2 3 1 0] before the transmission gap, the RV sequence=[3 1] after the transmission gap. In such an example, the RV=2 may be skipped in addition to the transmission gap.

Figure 9:
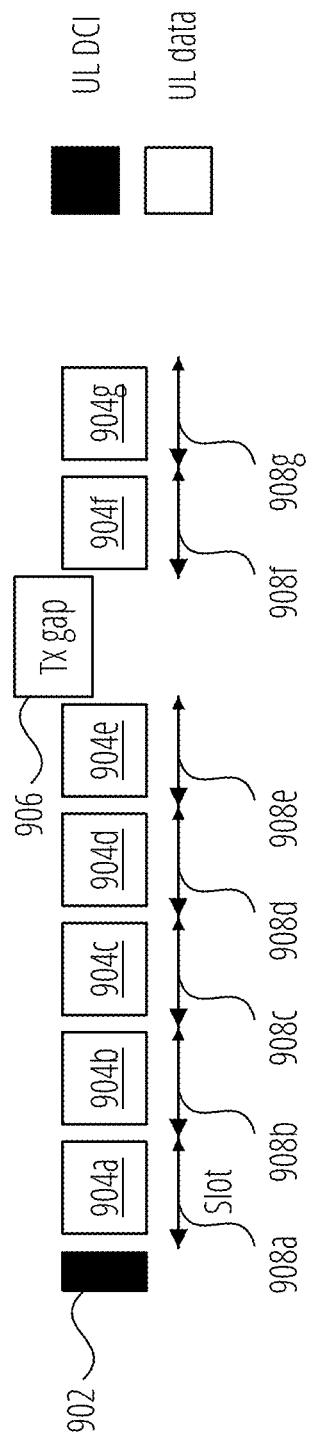
FIG. 9 illustrates an example using a total number of repetitions when handling a transmission gap in accordance with one embodiment.

FIG. 9 illustrates the use of a total number of repetitions when handling a transmission gap. In particular, FIG. 9 corresponds to the second option related to transmission gap operation with respect to PUSCH repetition Type A discussed above (i.e., maintaining a total number of slots for repetition when utilizing a transmission gap). In particular, FIG. 9 may correspond to an example having eight repetitions of UL data transmissions (i.e., R=8) with a first segment having five repetitions (i.e., S=5). Accordingly, as shown, FIG. 9 includes a UL grant DCI 902 followed by five transmissions/retransmissions of UL data (i.e., UL data transmission 904a through UL data transmission 904e) that are each transmitted during a corresponding slot (i.e., slot 908a through slot 908e) in the first segment. After the first segment of five transmissions/retransmissions of UL data, a transmission gap 906 may be utilized. Assuming a length of the transmission gap is one slot (i.e., as implied here), two slots may remain for performing repetitions (i.e., 5 slots of repetitions+1 slot of transmission gap+2 remaining slots of repetitions=8 total slots). As such, the remaining repetitions may be performed in the form of UL data transmission 904f and UL data transmission 904g. Accordingly, each slot is utilized to perform a transmission/retransmission along with a transmission gap with no additional slots for completing a total number of repetitions in addition to a transmission gap. As such, if the transmission gap length were 2 slots in the example of FIG. 9, only a single transmission of the UL data would take place after the transmission gap. Once again, any of Case 1, Case 2, or Case 3 of the second option may be utilized with respect to the example of FIG. 9.

Figure 10:
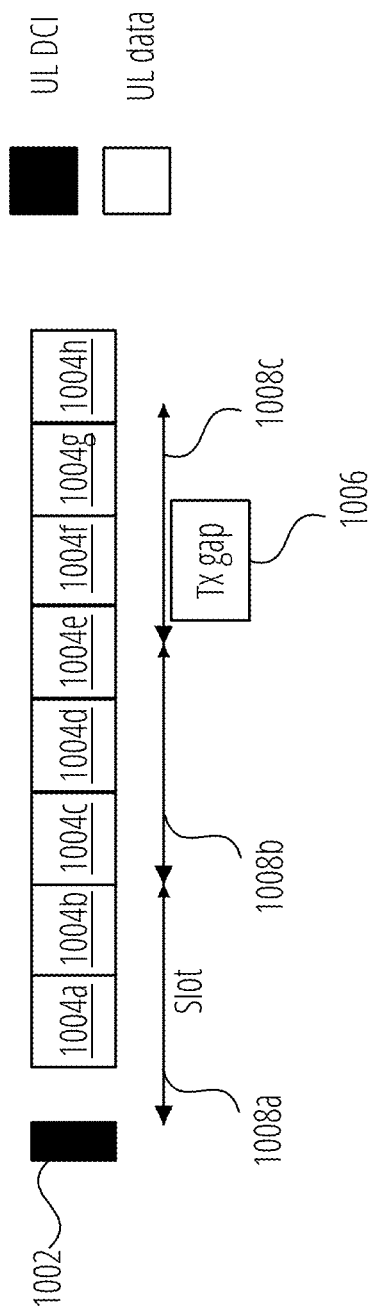
FIG. 10 illustrates an aspect of the subject matter in accordance with one embodiment.

A third solution, which is related to operation of a transmission gap with respect to PUSCH repetition Type B, may include various options. Accordingly, FIG. 10 illustrates a general example of a transmission gap between a number of transmissions/retransmissions with respect to PUSCH repetition Type B. As shown, FIG. 10 includes a UL grant DCI 1002 followed by eight nominal UL data transmission repetitions (i.e., transmission repetition 1004a through transmission repetition 1004h) that are each transmitted within one of three slots (i.e., slot 1008a through slot 1008c). Accordingly, each slot may include more than one of such repetitions. In addition, FIG. 10 includes a transmission gap 1006. Notably, FIG. 7 does not explicitly indicate how the transmission gap 1006 is handled. However, FIG. 11, FIG. 12A, and FIG. 12B each illustrate particular a manner in which such a transmission gap may be handled.

In a first option related to the transmission gap operation with respect to PUSCH repetition Type B, symbols/slots of a transmission gap may be treated as DL symbols/slots. In particular, the first option may include: 1. Segmentation of nominal repetitions (e.g., the nominal transmission repetitions 1004a through 1004h of FIG. 10) to actual repetitions based on the transmission gap, DL symbols, and other invalid symbols; 2. Dropping orphan symbols due to the transmission gap, if the length of a nominal repetition is larger than one slot; 3. Inter-repetition frequency hopping or inter-slot frequency hopping; and 4. RV sequences as follows: a. Case 1: RV sequence continuity after a transmission gap; or b. Case 2: An RV sequence restart after a transmission gap.

Figure 11:
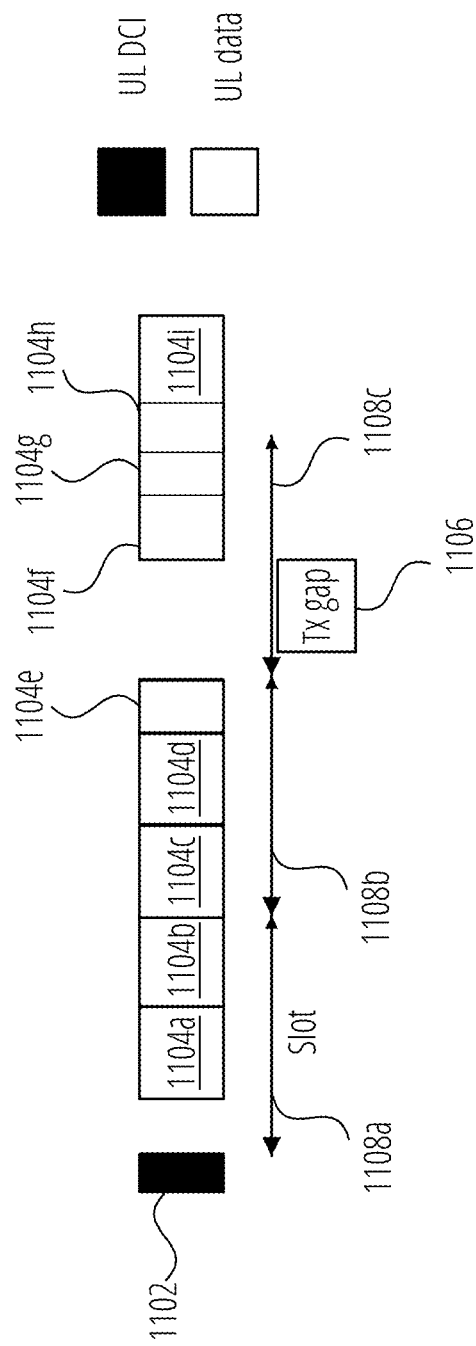
FIG. 11 illustrates an example of a transmission gap between a number of transmissions/retransmissions with respect to PUSCH repetition Type B in accordance with one embodiment.

FIG. 11 illustrates an example of treating a transmission gap as a DL symbol or a DL slot with respect to PUSCH repetition Type B. Accordingly, FIG. 11 corresponds to the first option related to transmission gap operation with respect to PUSCH repetition Type B discussed above. As shown, FIG. 11 includes a UL grant DCI 1102 followed by five actual repetitions of transmissions/retransmissions of UL data (i.e., UL data transmission 1104a through UL data transmission 1104e) that are each transmitted during a slot 1108a or slot 1108b. After transmission of the UL data transmission 1104e, a transmission gap 1106 may occur. The transmission gap 1106 may be treated like DL symbols/slots such that the UE may refrain from transmitting during the transmission gap. The remaining portion of actual repetitions may then be performed in the form of UL data transmission 1104f through UL data transmission 1104i after the transmission gap 1106, each of which may occur during the final slot 1108c. Once again, either Case 1 or Case 2 of the first option may be utilized with respect to the example of FIG. 11.

In a second option related to the transmission gap operation with respect to PUSCH repetition Type B, a total number of actual repetitions before the transmission gap may be maintained (i.e., the full number of repetitions to be performed will be performed despite having a transmission gap somewhere in the middle of such repetitions). In particular, the second option may include: 1. Starting a new full repetition after the transmission gap; 2. Continuing the repetitions after the transmission gap until the total number of actual repetitions are performed despite the transmission gap; 3. Dropping orphan symbols dropped due to the transmission gap, if the length of the nominal repetition is larger than one; 4; Inter-repetition frequency hopping or inter-slot frequency hopping; and 5. RV sequences as follows: a. Case 1: RV sequence continuity after a transmission gap; or b. Case 2: An RV sequence restart after the transmission gap.

Figure 12A:
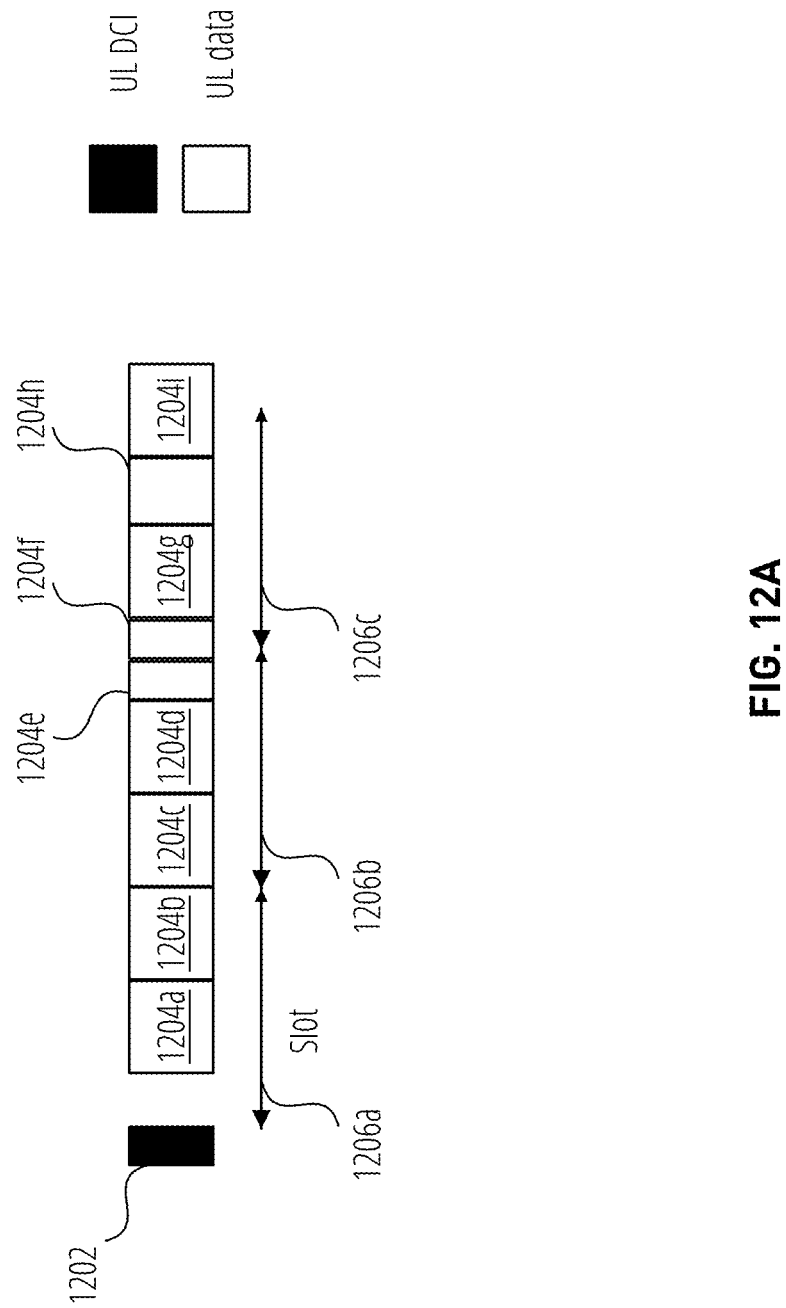
FIG. 12A illustrates an example of treating a transmission gap as a DL symbol or a DL slot with respect to PUSCH repetition Type B in accordance with one embodiment.

FIG. 12A illustrates an example of a total number of actual repetitions with respect to PUSCH repetition Type B in contrast to the eight nominal repetitions of FIG. 10. As shown, FIG. 12A includes a UL grant DCI 1202 followed by nine actual transmissions/retransmissions of UL data (i.e., UL data transmission 1204a through UL data transmission 1204i) that are each transmitted during a slot 1206a, a slot 1206b, or a slot 1206c.

Figure 12B:
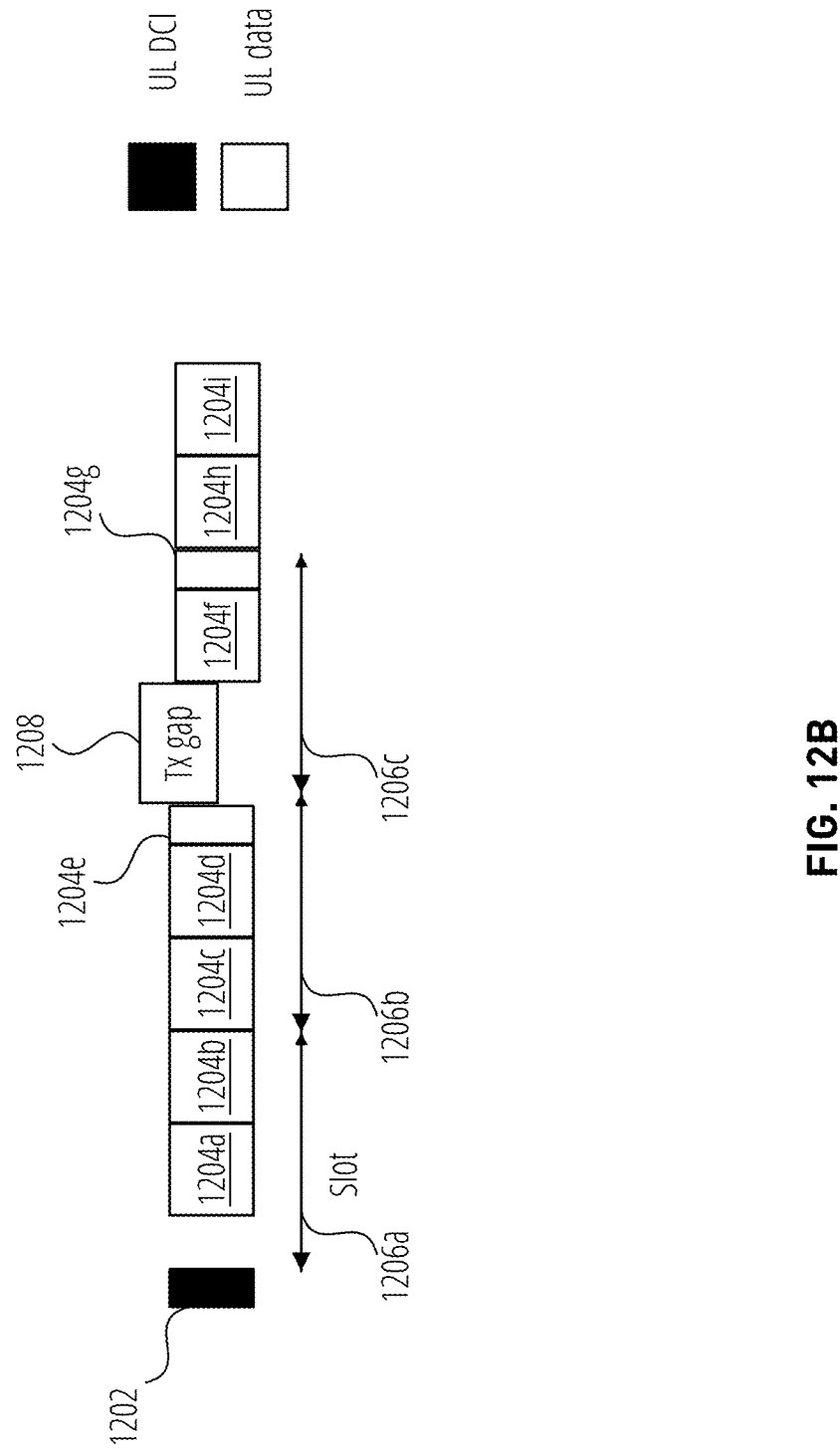
FIG. 12B illustrates an example of a total number of actual repetitions with respect to PUSCH repetition Type B in accordance with one embodiment.

FIG. 12B illustrates an example of maintaining a total number of actual repetitions when using a transmission gap with respect to PUSCH repetition Type B. Accordingly, FIG. 12B corresponds to the second option related to transmission gap operation with respect to PUSCH repetition Type B discussed above. As shown, FIG. 12A includes a UL grant DCI 1202 followed by nine transmissions/retransmissions of UL data (i.e., UL data transmission 1204a through UL data transmission 1204i) that are each transmitted during a slot 1206a, a slot 1206b, or a slot 1206c. In addition, FIG. 12B includes a transmission gap 1208 that occurs between repetitions comprising the UL data transmission 1204e and the UL data transmission 1204f. Accordingly, despite the transmission gap 1208, nine repetitions of UL data transmissions are performed, as shown in the same example without a transmission gap in FIG. 12A. Once again, either Case 1 or Case 2 of the second option may be utilized with respect to the example of FIG. 12B.

Figure 13:
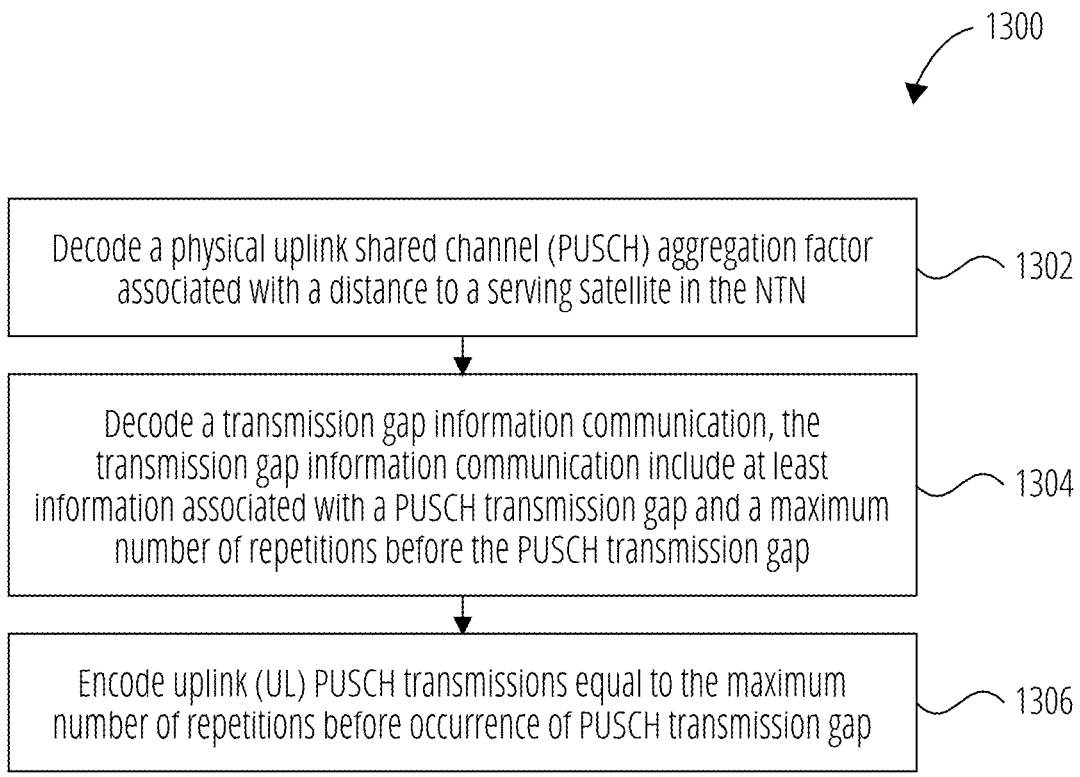
FIG. 13 illustrates a method for indicating a transmission gap at a user equipment (UE) in a non-terrestrial network (NTN) in accordance with one embodiment.

FIG. 13 illustrates a flowchart of a method 1300 for indicating a transmission gap at a user equipment (UE) in a non-terrestrial network (NTN). In block 1302, the method 1300 decodes a physical uplink shared channel (PUSCH) aggregation factor associated with a distance to a serving satellite in the NTN. For instance, the PUSCH aggregation factor may comprise a K_offset value associated with a distance between a serving satellite of the NTN and a UE (either the farthest UE from the serving satellite in the NTN or the particular UE itself).

In block 1304, the method 1300 decodes a transmission gap information communication. The transmission gap information communication includes at least information associated with a PUSCH transmission gap and a maximum number of repetitions before the PUSCH transmission gap. In block 1306, the method 1300 encodes uplink (UL) PUSCH transmissions equal to the maximum number of repetitions before occurrence of PUSCH transmission gap. Accordingly, a maximum number of repetitions may be performed regardless of a transmission gap.

The method 1300 may further include the PUSCH aggregation factor being semi-statically configured or dynamically indicated via time domain resource allocation (TDRA). The method 1300 may further include the transmission gap information communication comprising downlink control information (DCI) and including a length of the PUSCH transmission gap. The method 1300 may further include the maximum number of repetitions being defined in terms of slots.

The method 1300 may further include the transmission gap information communication comprising a configuration of the PUSCH transmission gap. The method 1300 may further include the configuration of the PUSCH transmission gap being provided via a system information block (SIB), a radio resource control (RRC) configuration, or a medium access control (MAC) control element (CE). The method 1300 may further include the configuration of the PUSCH transmission gap including a length of the PUSCH transmission gap. The method 1300 may further include the transmission gap information communication comprising a combination of downlink control information (DCI) and a time domain resource allocation (TDRA) table.

Figure 14:
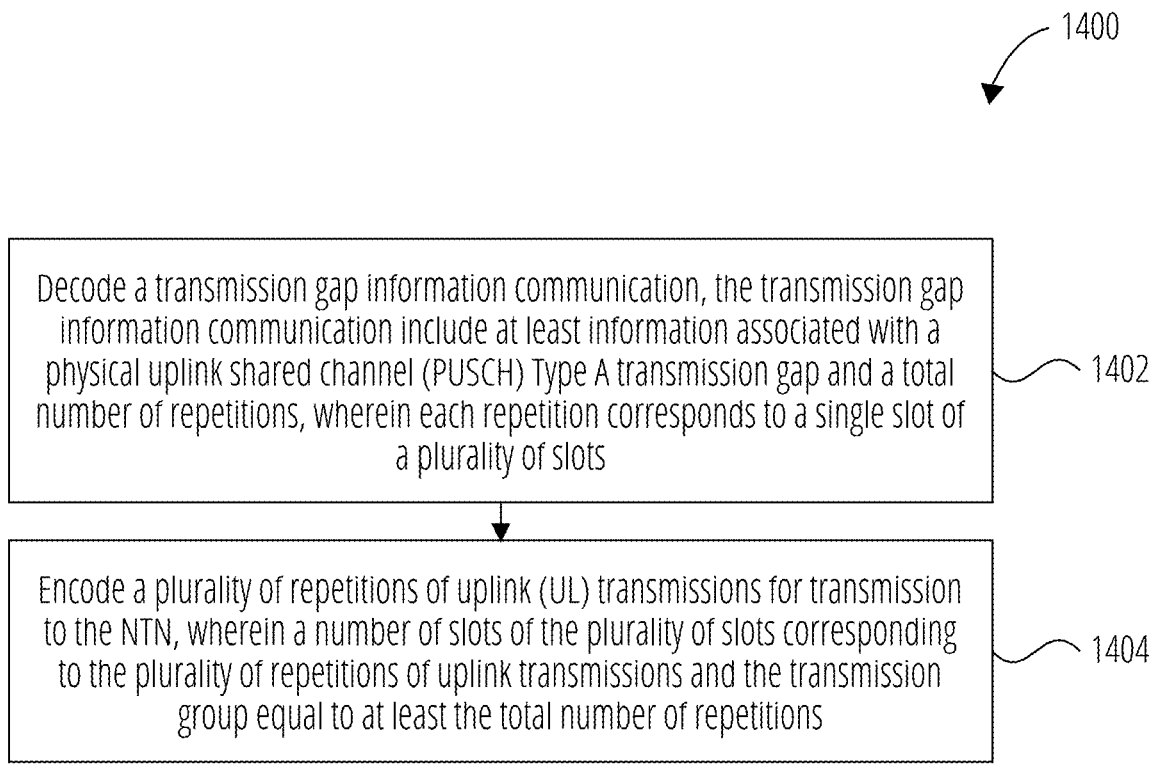
FIG. 14 illustrates a method for performing repetitions with respect to a transmission gap at a user equipment (UE) in a non-terrestrial network (NTN) in accordance with one embodiment.

FIG. 14 illustrates a flowchart of a method 1400 for performing repetitions with respect to a transmission gap at a user equipment (UE) in a non-terrestrial network (NTN). In block 1402, the method 1400 decodes a transmission gap information communication. The transmission gap information communication may include at least information associated with a physical uplink shared channel (PUSCH) Type A transmission gap and a total number of repetitions. In addition, each repetition may correspond to a single slot of a plurality of slots. In block 1404, the method 1400 encodes a plurality of repetitions of uplink (UL) transmissions for transmission to the NTN. A number of slots of the plurality of slots may correspond to the plurality of repetitions of uplink transmissions and the transmission gap may equal at least the total number of repetitions.

The method 1400 may further include the transmission gap information communication further including a maximum number of repetitions before the transmission gap. The method 1400 may further include the plurality of repetitions of UL transmissions including a subset of repetitions of UL transmissions equal to the maximum number of repetitions before the transmission gap occurring prior to the transmission gap.

The method 1400 may further include a number of the plurality of repetitions of UL transmissions being equal to the total number of repetitions. The method 1400 may further include the number of slots of the plurality of slots being exactly equal to the total number of repetitions.

Figure 15:
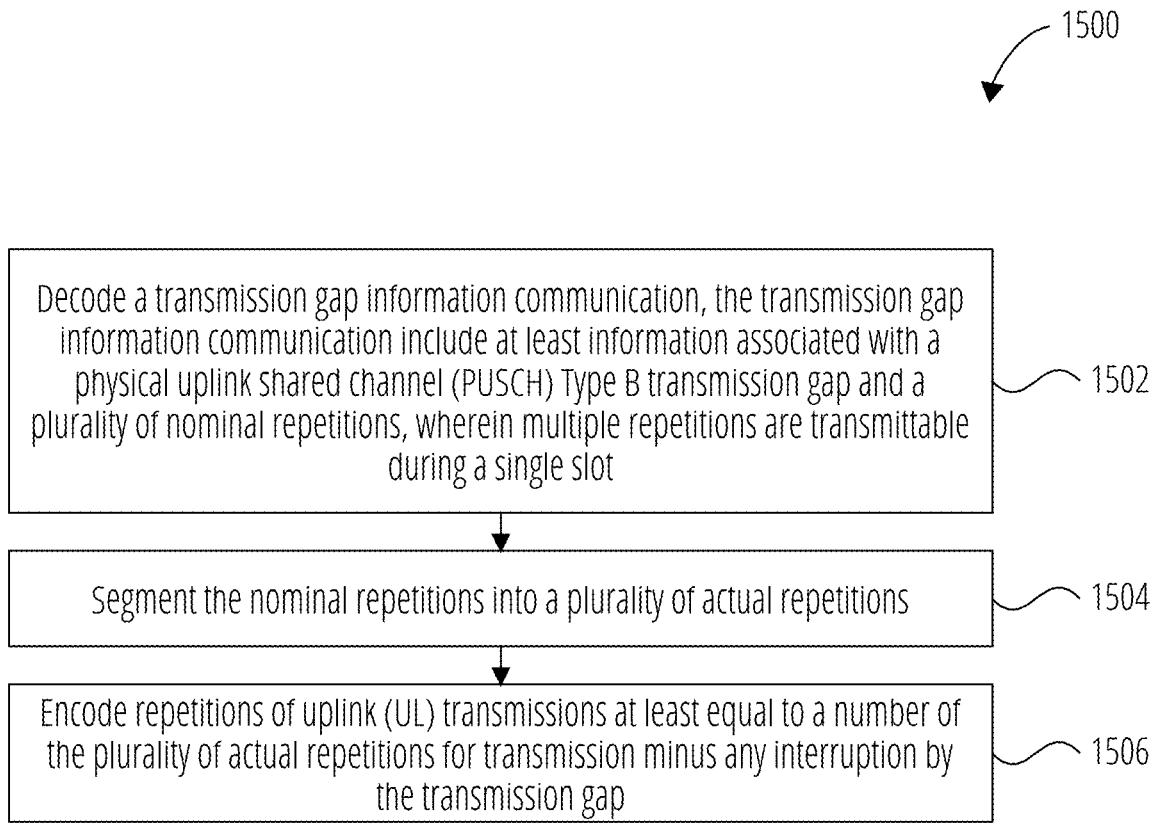
FIG. 15 illustrates a method for performing repetitions with respect to a transmission gap at a user equipment (UE) in a non-terrestrial network (NTN) in accordance with one embodiment.

FIG. 15 illustrates a flowchart of a method 1500 for performing repetitions with respect to a transmission gap at a user equipment (UE) in a non-terrestrial network (NTN). In block 1502, the method 1500 decodes a transmission gap information communication. The transmission gap information communication may include at least information associated with a physical uplink shared channel (PUSCH) Type B transmission gap and a plurality of nominal repetitions. In addition, multiple repetitions may be transmittable during a single slot.

In block 1504, the method 1500 segments the nominal repetitions into a plurality of actual repetitions. For instance, the nominal repetitions of FIG. 10 may be segmented into the actual repetitions of FIGS. 11, 12A, and 12B. In block 1506, the method 1500 encodes repetitions of uplink (UL) transmissions at least equal to a number of the plurality of actual repetitions for transmission minus any interruption by the transmission gap. Accordingly, a transmission gap may affect the total number of repetitions, in some embodiments.

The method 1500 may further include handling the transmission gap as one or more downlink slots or symbols such that transmission of the repetitions of UL transmissions does not occur during the transmission gap. The method 1500 may further include orphan symbols being dropped due to the transmission gap when a length of each of the plurality of nominal repetitions is larger than one slot. The method 1500 may further include performing inter-repetition frequency hopping or inter-slot frequency hopping.

The method 1500 may further include the repetitions of UL transmissions being exactly equal to a number of the plurality of actual repetitions. The method 1500 may further include transmission of a new full repetition of the repetitions of UL transmissions starting immediately after the transmission gap. The method 1500 may further include orphan symbols being dropped due to the transmission gap when a length of each of the plurality of nominal repetitions is larger than one slot. The method 1500 may further include performing inter-repetition frequency hopping or inter-slot frequency hopping.

Embodiments contemplated herein include an apparatus comprising means to perform one or more elements of the method 1300, the method 1400, and the method 1500. This apparatus may be, for example, an apparatus of a UE (such as a wireless device 1902 that is a UE, as described herein).

Embodiments contemplated herein include one or more non-transitory computer-readable media comprising instructions to cause an electronic device, upon execution of the instructions by one or more processors of the electronic device, to perform one or more elements of the method 1300, the method 1400, and the method 1500. This non-transitory computer-readable media may be, for example, a memory of a UE (such as a memory 1906 of a wireless device 1902 that is a UE, as described herein).

Embodiments contemplated herein include an apparatus comprising logic, modules, or circuitry to perform one or more elements of the method 1300, the method 1400, and the method 1500. This apparatus may be, for example, an apparatus of a UE (such as a wireless device 1902 that is a UE, as described herein).

Embodiments contemplated herein include an apparatus comprising: one or more processors and one or more computer-readable media comprising instructions that, when executed by the one or more processors, cause the one or more processors to perform one or more elements of the method 1300, the method 1400, and the method 1500. This apparatus may be, for example, an apparatus of a UE (such as a wireless device 1902 that is a UE, as described herein).

Embodiments contemplated herein include a signal as described in or related to one or more elements of the method 1300, the method 1400, and the method 1500.

Embodiments contemplated herein include a computer program or computer program product comprising instructions, wherein execution of the program by a processor is to cause the processor to carry out one or more elements of the method 1300, the method 1400, and the method 1500. The processor may be a processor of a UE (such as a processor(s) 1904 of a wireless device 1902 that is a UE, as described herein). These instructions may be, for example, located in the processor and/or on a memory of the UE (such as a memory 1906 of a wireless device 1902 that is a UE, as described herein).

Figure 16:
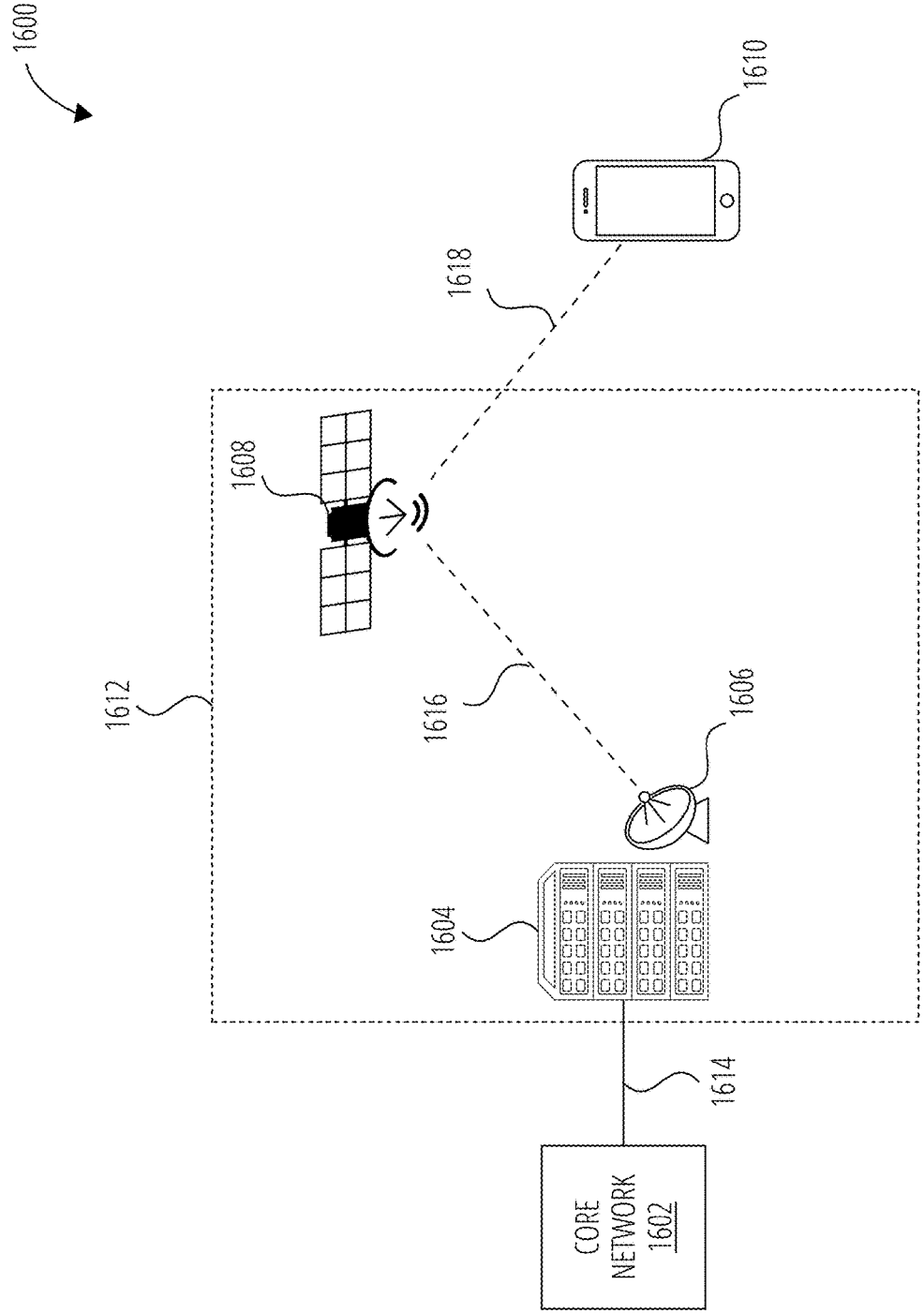
FIG. 16 illustrates a non-terrestrial network (NTN) architecture of a wireless communication system, according to an embodiment.

FIG. 16 illustrates a non-terrestrial network (NTN) architecture 100 of a wireless communication system, according to an embodiment. The NTN architecture 1600 includes a core network (CN) 1602, a terrestrial base station 1604, a satellite gateway 1606, a satellite 1608, and a UE 1610. The terrestrial base station 1604, the satellite gateway 1606, and the satellite 1608 may be included in a RAN 1612.

In some embodiments, the RAN 1612 includes E-UTRAN, the CN 1602 includes an EPC, and the terrestrial base station 1604 includes an eNB. In these cases, the CN link 1614 connecting the CN 1602 and the terrestrial base station 1604 may include an S1 interface.

In some embodiments, RAN 1612 includes NG-RAN, the CN 1602 includes a 5GC, and the terrestrial base station 1604 includes a gNB or a next generation eNB (ng-eNB). In such cases, the CN link 1614 connecting the CN 1602 and the terrestrial base station 1604 may include an NG interface.

The NTN architecture 1600 illustrates a "bent-pipe" or "transparent" satellite based architecture. In such bent-pipe systems, the terrestrial base station 1604 uses the satellite gateway 1606 to communicate with the satellite 1608 over a feeder link 1616. The satellite 1608 may be equipped with one or more antennas capable of broadcasting a cell according to the RAN 1612, and the UE 1610 may be equipped with one or more antennas (e.g., a moving parabolic antenna, an omni-directional phased-array antenna, etc.) capable of communicating with the satellite 1608 via a Uu interface on that cell (such communications may be said to use the illustrated service link 1618). A payload sited on the satellite 1608 then transparently forwards data between the satellite gateway 1606 and the UE 1610 using the feeder link 1616 between the satellite gateway 1606 and the satellite 1608 and the service link 1618 between the satellite 1608 and the UE 1610. The payload may perform RF conversion and/or amplification in both uplink (UL) and downlink (DL) to enable this communication.

In the embodiment shown in FIG. 16, the terrestrial base station 1604 is illustrated without the capability of terrestrial wireless communication directly with a UE. However, it is contemplated that in other embodiments, such a terrestrial base station using the satellite gateway 1606 to communicate with the satellite 1608 could (also) have this functionality (i.e., as in the terrestrial base station 1812 and the terrestrial base station 1814 of FIG. 18, to be described below).

Figure 17:
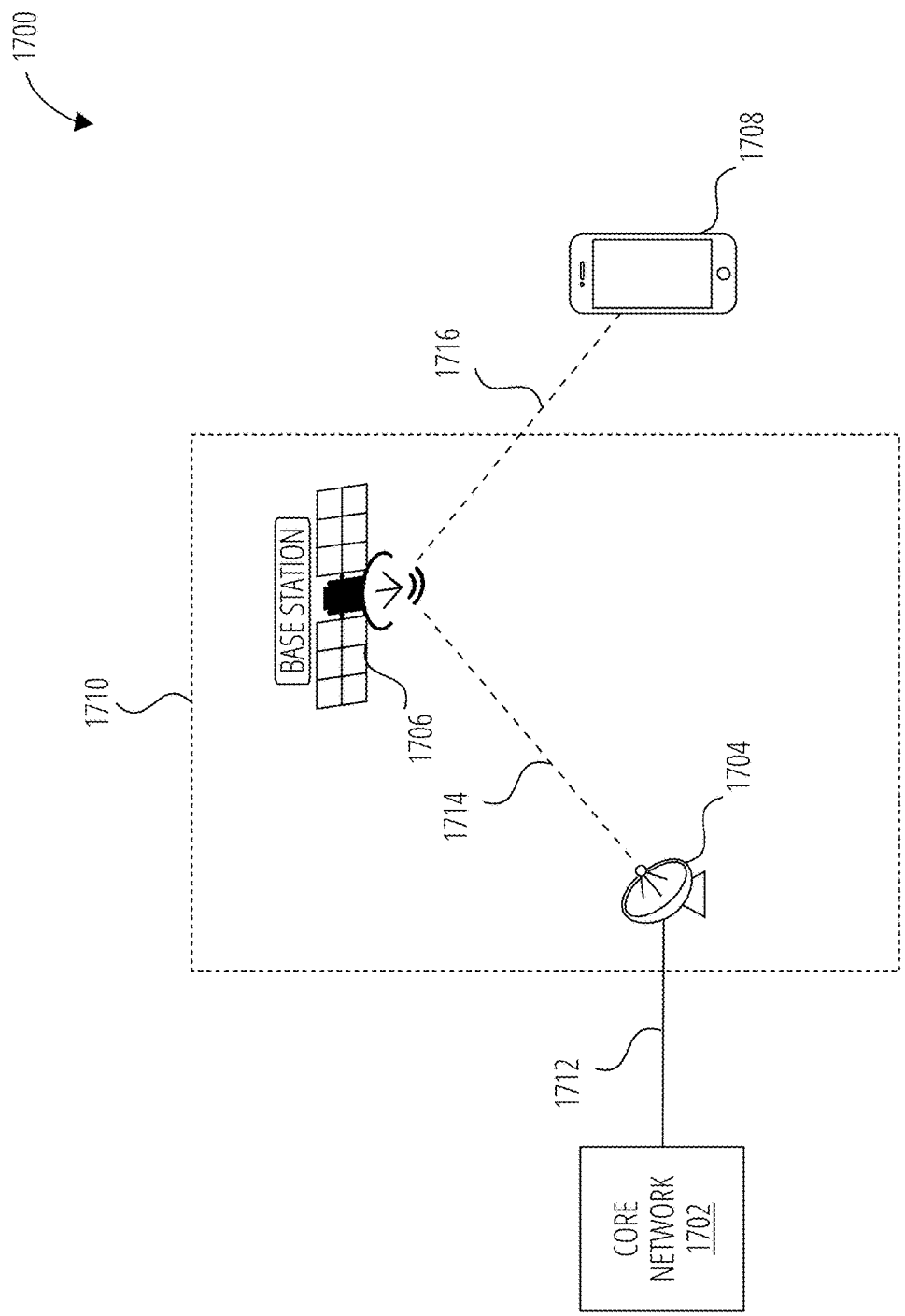
FIG. 17 illustrates an NTN architecture of a wireless communication system, according to an embodiment.

FIG. 17 illustrates an NTN architecture 1700 of a wireless communication system, according to an embodiment. The NTN architecture 1700 includes a CN 1702, a satellite gateway 1704, a satellite base station 1706, and a UE 1708. The satellite gateway 1704 and the satellite base station 1706 may be included in the RAN 1710.

In some embodiments, the RAN 1710 includes E-UTRAN and the CN 1702 includes an EPC. In these cases, the CN link 1712 connecting the CN 1702 and the satellite gateway 1704 may include an S1 interface.

In some embodiments, RAN 1710 includes NG-RAN and the CN 1702 includes a 5GC. In such cases, the CN link 1712 connecting the CN 1702 and the satellite gateway 1704 may include an NG interface.

The NTN architecture 1600 implements a "regenerative" satellite based architecture. In such regenerative systems, the functionalities of a base station are sited on the satellite base station 1706, and the communications between these base station functions and the CN 1702 occur through a forwarding of interface(s) (e.g., a S1 interface and/or an NG interface) found on the CN link 1712 through the satellite gateway 1704 and a feeder link 1714 to the satellite base station 1706. The satellite base station 1706 may be equipped with one or more antennas capable of broadcasting a cell according to the RAN 1710, and the UE 1708 may be equipped with one or more antennas (e.g., a moving parabolic antenna, an omni-directional phased-array antenna, etc.) capable of communicating with the satellite base station 1706 via a Uu interface on that cell (such communications may be said to use the illustrated service link 1716). A payload sited on the satellite base station 1706 then forwards data between the satellite gateway 1704 and the UE 1708 using the feeder link 1714 between the satellite gateway 1704 and the satellite base station 1706 and the service link 1716 between the satellite base station 1706 and the UE 1708. The payload may perform RF conversion and/or amplification in both uplink (UL) and downlink (DL) to enable this communication, as well as implement the functionalities of the base station (e.g., as an eNB, ng-eNB or a gNB, as corresponding to the type of the RAN 1710) as these have been sited on the satellite base station 1706.

In embodiments of NTN architectures comprising NG-RAN that also use integrated access and backhaul (IAB), it is possible that a gNB control unit functionality (CU) could be sited terrestrially and may use a satellite gateway to communicate with a satellite that hosts a corresponding gNB donor unit functionality (DU), with the F1 interface(s) between the CU and the DU underpinned by the feeder link 1714. In such cases, the CU and the DU may each be understood to be part of the NG-RAN.

In wireless communications systems using NTN architectures (such as those described in relation to FIG. 16 and FIG. 17 above), it may be that coverage holes may exist when the density of satellites used is insufficient to provide cells covering the entire network operator's deployment area.

Such coverage holes may be spatial and/or temporal in nature. An example of a spatial coverage hole may be that a satellite may provide coverage of a first area, and there may not be a second satellite providing a cell to a second area (meaning that the second area is a coverage hole). As a UE using the satellite to communicate moves, it may leave the first area and enter the second area such that it leaves coverage.

Temporal coverage holes may occur due to satellite movement relative to a fixed position on the planetary surface. While some satellites of some NTNs may be placed in a geostationary earth orbit (GEO), this requires placement at a specific radius relative to the earth. Further, this distance is further out that many feasible distances for low earth orbits (LEDs) or medium earth orbits (MEOs) where a satellite could alternatively be placed. Accordingly, due to cost, orbital capacity, and other factors, it is anticipated that (at least some) satellites of (at least some) NTNs may be placed in, for example, LEOs or MEOs (rather than GEOs).

However, a satellite in LEO or MEO (instead of GEO) travels faster than the rotation speed of the earth in order to maintain its orbit. Accordingly, from the perspective of a fixed position on the earth's surface, such a satellite will move (taking any of its cells along with it). This may occur even in the case of quasi-earth fixed cells (where a satellite changes an antenna beam pattern to illuminate a determined portion of the surface while it is moving), as eventually the satellite (due to movement) will be outright unable to reach that portion of the surface. Thus, a UE at that position on the surface may enjoy coverage provided by the satellite when the satellite is in an appropriate location within its orbit to provide a cell at that position, and may lose coverage (fall into a temporal coverage hole) as the satellite moves further along its orbit.

In networks (or portions of networks) implementing terrestrial transmission reception points (TRPs), when a UE leaves coverage provided by a terrestrial TRP (e.g., due to UE mobility), the UE may be configured to continuously/constantly perform cell search. This behavior may be based on an implicit assumption that the UE is relatively likely to soon enter a coverage state associated with the same or another terrestrial TRP in such networks (e.g., due to an underlying assumption that the UE is likely being operated in locations where terrestrial-based coverage is anticipated by the user of the UE).

However, due to the cost and complexity of provisioning satellites for an NTN (as compared to, e.g., providing terrestrial TRPs), the satellite density of the NTN and thus the density of cells corresponding to the satellites of the NTN may be relatively lower than in the network (or portion of the network) using terrestrial TRPs. Accordingly, it may be expected that UEs operating using cells provided by the satellites of NTNs may encounter more frequent and extended periods of time (relative to a typical terrestrial TRP case) where they are out of coverage (due to their entry into the coverage holes described above). Herein, a UE that is expected to experience these (or other) types of frequent and extended periods out of coverage may be said to be experiencing "discontinuous coverage."

It may be that some UEs use the satellites of the NTN for coverage (and thus may experience discontinuous coverage) because they are located remotely from established infrastructure supporting terrestrial TRPs. This may motivate a use of lower amounts of power at such a UE (e.g., to conserve a battery of the UE and/or to not overtax a relatively limited power source for the UE such as a small solar panel). It may also be that satellites of the NTN can also benefit from power savings, in that these are also usually supplied with power by more limited power sources that can be available while in orbit, such as batteries and/or solar panels.

In these NTN (and other) circumstances, it may be beneficial to configure one or more elements of the wireless communication system to gracefully suspend/interrupt certain procedures (e.g., cell search/connect/camping procedures at the UE, network paging/communication procedures that use the satellite, etc.) in reaction to a loss of coverage at the UE due to a coverage hole, out of a recognition that there is no point in using power to perform these procedures during periods when communications are in any event not possible.

Then, assuming that an ephemeris for the satellites of the NTN is known at the UE (e.g., via pre-configuration and/or by system information provided by one or more satellites themselves), and that the location and/or mobility of the UE is known to the UE (e.g., via pre-configuration (in the case of a stationary UE) and/or global positioning system (GPS)/global navigation satellite system (GNSS) (in the case of a mobile UE)), it may be that the UE can predict when and/or where it is likely to be in or out of coverage. Accordingly, the UE may preemptively (prior to losing coverage) inform the either/both of a CN (e.g., via non-access stratum (NAS) messages) and/or a base station (e.g., via access stratum (AS) messages, such as radio resource control (RRC) messages) that it is going to lose coverage, and/or when and/or where it will regain coverage. The CN/base station may then accordingly be aware of the later time and/or location at which coverage to the UE is expected to be restored. This time and/or location may be used to restart, at the relevant element (UE, CN, base station) any suspended procedures of the wireless communication system relative to these elements.

Figure 18:
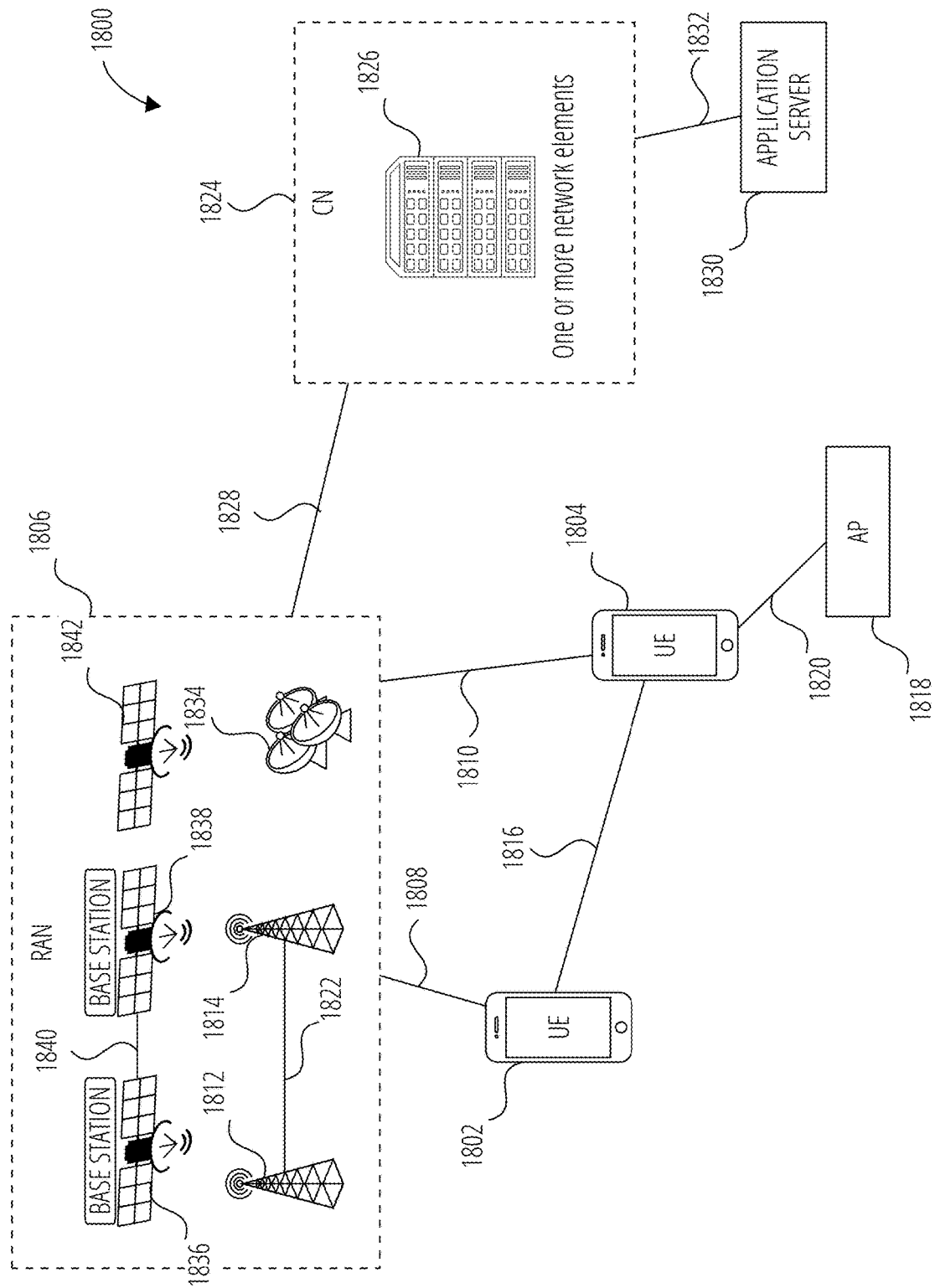
FIG. 18 illustrates an example architecture of a wireless communication system, according to embodiments disclosed herein.

FIG. 18 illustrates an example architecture of a wireless communication system 1800, according to embodiments disclosed herein. The following description is provided for an example wireless communication system 1800 that operates in conjunction with the LTE system standards and/or 5G or NR system standards as provided by 3GPP technical specifications and other 3GPP documents.

As shown by FIG. 18, the wireless communication system 1800 includes UE 1802 and UE 1804 (although any number of UEs may be used). In this example, the UE 1802 and the UE 1804 are illustrated as smartphones (e.g., handheld touchscreen mobile computing devices connectable to one or more cellular networks), but may also comprise any mobile or non-mobile computing device configured for wireless communication.

The UE 1802 and UE 1804 may be configured to communicatively couple with a RAN 1806. In embodiments, the RAN 1806 may be NG-RAN, E-UTRAN, etc. The UE 1802 and UE 1804 utilize connections (or channels) (shown as connection 1808 and connection 1810, respectively) with the RAN 1806, each of which comprises a physical communications interface. The RAN 1806 can include one or more base stations (such as terrestrial base station 1812, the terrestrial base station 1814 the satellite base station 1836 and the satellite base station 1838) and/or other entities (e.g., the satellite 1842, which may not have base station functionality) that enable the connection 1808 and connection 1810. One or more satellite gateways 1834 may integrate the satellite base station 1836, satellite base station 1838, and/or the satellite 1842 into the RAN 1806, in the manners (and with the appropriate elements) described in relation to the NTN architecture 1600 of FIG. 16 and the NTN architecture 1700 of FIG. 17.

In this example, the connection 1808 and connection 1810 are air interfaces to enable such communicative coupling, and may be consistent with RAT(s) used by the RAN 1806, such as, for example, an LTE and/or NR. It is contemplated that the connection 1808 and connection 1810 may include, in some embodiments, service links between their respective UE 1802, UE 1804 and one or more of the satellite base station 1836, the satellite base station 1838, and the satellite 1842.

In some embodiments, the UE 1802 and UE 1804 may also directly exchange communication data via a sidelink interface 1816.

The UE 1804 is shown to be configured to access an access point (shown as AP 1818) via connection 1820. By way of example, the connection 1820 can comprise a local wireless connection, such as a connection consistent with any IEEE 802.11 protocol, wherein the AP 1818 may comprise a Wi-Fi® router. In this example, the AP 1818 may be connected to another network (for example, the Internet) without going through a CN 1824.

In embodiments, the UE 1802 and UE 1804 can be configured to communicate using orthogonal frequency division multiplexing (OFDM) communication signals with each other, with the terrestrial base station 1812, the terrestrial base station 1814, the satellite base station 1836, the satellite base station 1838, and/or the satellite 1842 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the terrestrial base station 1812, terrestrial base station 1814, the satellite base station 1836 and/or the satellite base station 1838 may be implemented as one or more software entities running on server computers as part of a virtual network.

In addition, or in other embodiments, the terrestrial base station 1812 or terrestrial base station 1814 may be configured to communicate with one another via interface 1822. In embodiments where the wireless communication system 1800 is an LTE system (e.g., when the CN 1824 is an EPC), the interface 1822 may be an X2 interface. The X2 interface may be defined between two or more base stations (e.g., two or more eNBs and the like) that connect to an EPC, and/or between two eNBs connecting to the EPC. It is contemplated than an inter-satellite link (ISL) may carry the X2 interface between in the case of two satellite base stations.

In embodiments where the wireless communication system 1800 is an NR system (e.g., when CN 1824 is a 5GC), the interface 1822 may be an Xn interface. An Xn interface is defined between two or more base stations that connect to 5GC (e.g., CN 1824). For example, the Xn interface may be between two or more gNBs that connect to 5GC, a gNB connecting to 5GC and an eNB, between two eNBs connecting to 5GC, and/or two or more satellite base stations via an ISL (as in, e.g., the interface 1840 between the satellite base station 1836 and the satellite base station 1838).

The RAN 1806 is shown to be communicatively coupled to the CN 1824. The CN 1824 may comprise one or more network elements 1826, which are configured to offer various data and telecommunications services to customers/subscribers (e.g., users of UE 1802 and UE 1804) who are connected to the CN 1824 via the RAN 1806. The components of the CN 1824 may be implemented in one physical device or separate physical devices including components to read and execute instructions from a machine-readable or computer-readable medium (e.g., a non-transitory machine-readable storage medium). For example, the components of the CN 1824 may be implemented in one or more processors and/or one or more associated memories.

In embodiments, the CN 1824 may be an EPC, and the RAN 1806 may be connected with the CN 1824 via an S1 interface 1828. In embodiments, the S1 interface 1828 may be split into two parts, an S1 user plane (S1-U) interface, which carries traffic data between the terrestrial base station 1812, terrestrial base station 1814, the satellite base station 1836, or the interface 1840 and a serving gateway (S-GW), and the S1-MME interface, which is a signaling interface between the terrestrial base station 1812, the terrestrial base station 1814 the satellite base station 1836, or the interface 1840 and mobility management entities (MMEs).

In embodiments, the CN 1824 may be a 5GC, and the RAN 1806 may be connected with the CN 1824 via an NG interface 1828. In embodiments, the NG interface 1828 may be split into two parts, an NG user plane (NG-U) interface, which carries traffic data between the terrestrial base station 1812, terrestrial base station 1814, satellite base station 1836, or satellite base station 1838 and a user plane function (UPF), and the S1 control plane (NG-C) interface, which is a signaling interface between the terrestrial base station 1812, terrestrial base station 1814 satellite base station 1836, or satellite base station 1838 and access and mobility management functions (AMFs).

Generally, an application server 1830 may be an element offering applications that use interne protocol (IP) bearer resources with the CN 1824 (e.g., packet switched data services). The application server 1830 can also be configured to support one or more communication services (e.g., VoIP sessions, group communication sessions, etc.) for the UE 1802 and UE 1804 via the CN 1824. The application server 1830 may communicate with the CN 1824 through an IP communications interface 1832.

Figure 19:
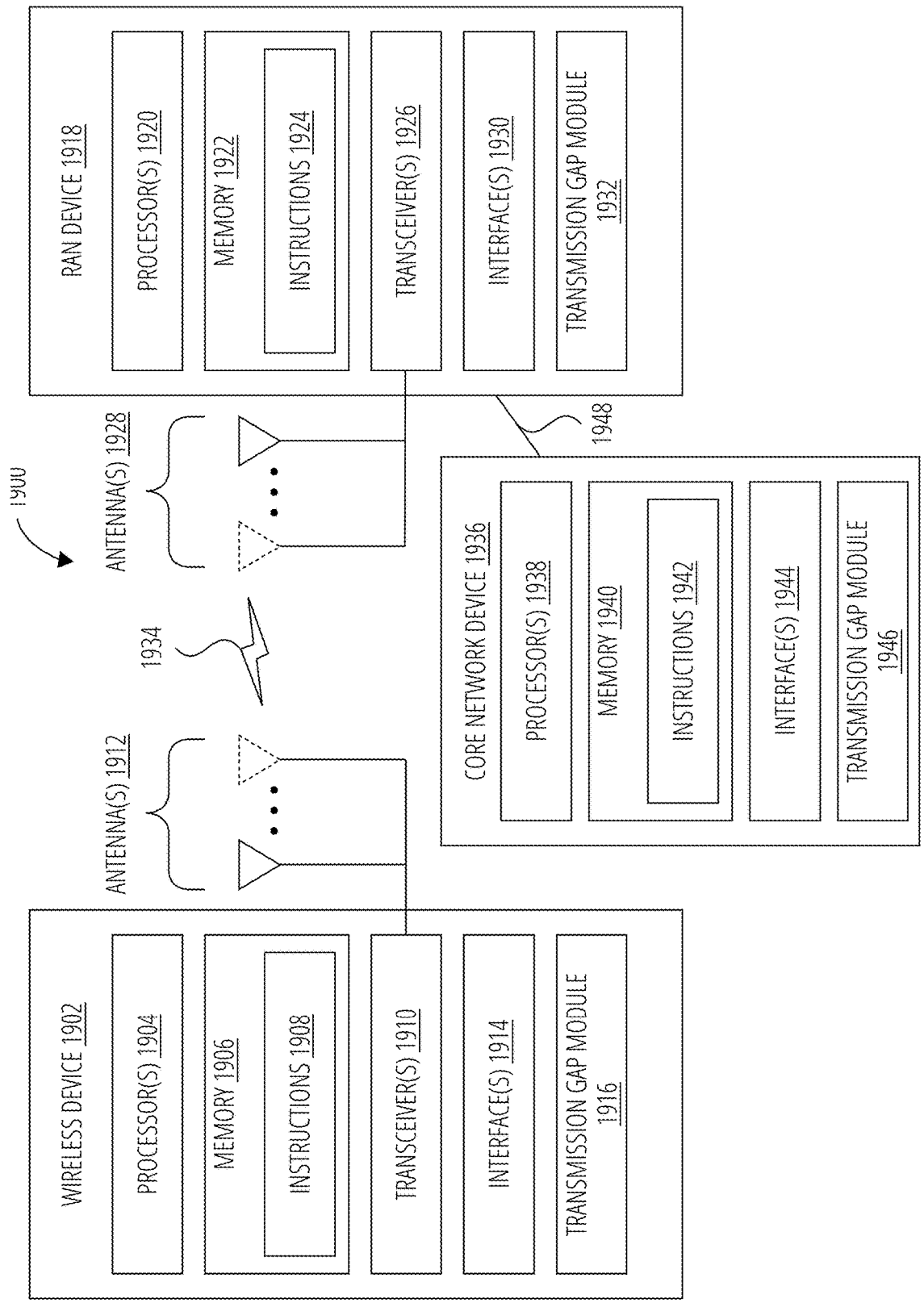
FIG. 19 illustrates a system for performing signaling between a wireless device and a network device, according to embodiments disclosed herein.

FIG. 19 illustrates a system 1900 for performing signaling 1934 between a wireless device 1902 and a RAN device 1918 connected to a core network of a CN device 1936, according to embodiments disclosed herein. The system 1900 may be a portion of a wireless communications system as herein described. The wireless device 1902 may be, for example, a UE of a wireless communication system. The RAN device 1918 may be, for example, a base station (e.g., an eNB or a gNB) of a wireless communication system that is a terrestrial base station or a satellite base station. The CN device 1936 may be one or more devices making up a CN, as described herein.

The wireless device 1902 may include one or more processor(s) 1904. The processor(s) 1904 may execute instructions such that various operations of the wireless device 1902 are performed, as described herein. The processor(s) 1904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1902 may include a memory 1906. The memory 1906 may be a non-transitory computer-readable storage medium that stores instructions 1908 (which may include, for example, the instructions being executed by the processor(s) 1904). The instructions 1908 may also be referred to as program code or a computer program. The memory 1906 may also store data used by, and results computed by, the processor(s) 1904.

The wireless device 1902 may include one or more transceiver(s) 1910 that may include radio frequency (RF) transmitter and/or receiver circuitry that use the antenna(s) 1912 of the wireless device 1902 to facilitate signaling (e.g., the signaling 1934) to and/or from the wireless device 1902 with other devices (e.g., the RAN device 1918) according to corresponding RATs. In some embodiments, the antenna(s) 1912 may include a moving parabolic antenna, an omnidirectional phased-array antenna, or some other antenna suitable for communication with a satellite, (e.g., as described above in relation to the UE 1610 of FIG. 16 and the UE 1708 of FIG. 17).

For a RAN device 1918 that is a terrestrial base station, the network device signaling 1934 may occur on a feeder link between the wireless device 1902 and a satellite and a service link between the satellite and the RAN device 1918 (e.g., as described in relation to FIG. 16). For a RAN device 1918 that is a satellite base station, the signaling 1934 may occur on a feeder link between the wireless device 1902 and the RAN device 1918 (e.g., as described in relation to FIG. 17).

The wireless device 1902 may include one or more antenna(s) 1912 (e.g., one, two, four, or more). For embodiments with multiple antenna(s) 1912, the wireless device 1902 may leverage the spatial diversity of such multiple antenna(s) 1912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1902 may be accomplished according to precoding (or digital beamforming) that is applied at the wireless device 1902 that multiplexes the data streams across the antenna(s) 1912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1902 may implement analog beamforming techniques, whereby phases of the signals sent by the antenna(s) 1912 are relatively adjusted such that the (joint) transmission of the antenna(s) 1912 can be directed (this is sometimes referred to as beam steering).

The wireless device 1902 may include one or more interface(s) 1914. The interface(s) 1914 may be used to provide input to or output from the wireless device 1902. For example, a wireless device 1902 that is a UE may include interface(s) 1914 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 1910/antenna(s) 1912 already described) that allow for communication between the UE and other devices and may operate according to known protocols (e.g., Wi-Fi®, Bluetooth®, and the like).

The wireless device 1902 may include a transmission gap module 1916. The transmission gap module 1916 may be implemented via hardware, software, or combinations thereof. For example, the transmission gap module 1916 may be implemented as a processor, circuit, and/or instructions 1908 stored in the memory 1906 and executed by the processor(s) 1904. In some examples, the transmission gap module 1916 may be integrated within the processor(s) 1904 and/or the transceiver(s) 1910. For example, the transmission gap module 1916 may be implemented by a combination of software components (e.g., executed by a DSP or a general processor) and hardware components (e.g., logic gates and circuitry) within the processor(s) 1904 or the transceiver(s) 1910.

The transmission gap module 1916 may be used for various aspects of the present disclosure, for example, aspects of FIGS. 5, 6, 13, 14, and 15. The transmission gap module 1916 is configured to, for example, configure and handle transmission gaps in an NTN.

The RAN device 1918 may include one or more processor(s) 1920. The processor(s) 1920 may execute instructions such that various operations of the RAN device 1918 are performed, as described herein. The processor(s) 1904 may include one or more baseband processors implemented using, for example, a CPU, a DSP, an ASIC, a controller, an FPGA device, another hardware device, a firmware device, or any combination thereof configured to perform the operations described herein.

The RAN device 1918 may include a memory 1922. The memory 1922 may be a non-transitory computer-readable storage medium that stores instructions 1924 (which may include, for example, the instructions being executed by the processor(s) 1920). The instructions 1924 may also be referred to as program code or a computer program. The memory 1922 may also store data used by, and results computed by, the processor(s) 1920.

The RAN device 1918 may include one or more transceiver(s) 1926 that may include RF transmitter and/or receiver circuitry that use the antenna(s) 1928 of the RAN device 1918 to facilitate signaling (e.g., the signaling 1934) to and/or from the RAN device 1918 with other devices (e.g., the wireless device 1902) according to corresponding RATs.

The RAN device 1918 may include one or more antenna(s) 1928 (e.g., one, two, four, or more). In embodiments having multiple antenna(s) 1928, the RAN device 1918 may perform MIMO, digital beamforming, analog beamforming, beam steering, etc., as has been described.

For a RAN device 1918 that is a terrestrial base station, one or more of the transceiver(s) 1926 and/or the antenna(s) 1928 may instead be present on a satellite gateway associated with the base station (e.g., as shown in reference to the terrestrial base station 1604 and the satellite gateway 1606 of FIG. 16). For a RAN device 1918 that is a satellite base station, the transceiver(s) 1926 and/or the antenna(s) 1928 may be present on the satellite, and one or more of those antenna(s) 1928 may be antenna(s) appropriate for satellite communication (such as a moving parabolic antenna, an omni-directional phased-array antenna, etc.)

The RAN device 1918 may include one or more interface(s) 1930. The interface(s) 1930 may be used to provide input to or output from the RAN device 1918. For example, a RAN device 1918 that is a base station may include interface(s) 1930 made up of transmitters, receivers, and other circuitry (e.g., other than the transceiver(s) 1926/antenna(s) 1928 already described) that enables the base station to communicate with other equipment in a CN, and/or that enables the base station to communicate with external networks, computers, databases, and the like for purposes of operations, administration, and maintenance of the base station or other equipment operably connected thereto.

The RAN device 1918 may include a transmission gap module 1932. The transmission gap module 1932 may be implemented via hardware, software, or combinations thereof. For example, the transmission gap module 1932 may be implemented as a processor, circuit, and/or instructions 1924 stored in the memory 1922 and executed by the processor(s) 1920. In some examples, the transmission gap module 1932 may be integrated within the processor(s) 1920 and/or the transceiver(s) 1926. For example, the transmission gap module 1932 may be implemented by a combination of software components (e.g., executed by a DSP or a general processor) and hardware components (e.g., logic gates and circuitry) within the processor(s) 1920 or the transceiver(s) 1926.

The transmission gap module 1932 may be used for various aspects of the present disclosure, for example, aspects of FIGS. 5, 6, 13, 14, and 15. The transmission gap module 1932 is configured to, for example, configure and handle transmission gaps in an NTN.

The RAN device 1918 may communicate with the CN device 1936 via the interface 1948, which may be analogous to the interface 1828 of FIG. 18 (e.g., may be an S1 and/or NG interface, either of which may be split into user plane and control plane parts).

The CN device 1936 may include one or more processor(s) 1938. The processor(s) 1938 may execute instructions such that various operations of the CN device 1936 are performed, as described herein. The processor(s) 1938 may include one or more baseband processors implemented using, for example, a CPU, a DSP, an ASIC, a controller, an FPGA device, another hardware device, a firmware device, or any combination thereof configured to perform the operations described herein.

The CN device 1936 may include a memory 1940. The memory 1940 may be a non-transitory computer-readable storage medium that stores instructions 1942 (which may include, for example, the instructions being executed by the processor(s) 1938). The instructions 1942 may also be referred to as program code or a computer program. The memory 1940 may also store data used by, and results computed by, the processor(s) 1938.

The CN device 1936 may include one or more interface(s) 1944. The interface(s) 1944 may be used to provide input to or output from the CN device 1936. For example, a CN device 1936 may include interface(s) 1930 made up of transmitters, receivers, and other circuitry that enables the CN device 1936 to communicate with other equipment in the CN, and/or that enables the CN device 1936 to communicate with external networks, computers, databases, and the like for purposes of operations, administration, and maintenance of the CN device 1936 or other equipment operably connected thereto.

The CN device 1936 may include a transmission gap module 1946. The transmission gap module 1946 may be implemented via hardware, software, or combinations thereof. For example, the transmission gap module 1946 may be implemented as a processor, circuit, and/or instructions 1942 stored in the memory 1940 and executed by the processor(s) 1938. In some examples, the transmission gap module 1946 may be integrated within the processor(s) 1938. For example, the transmission gap module 1946 may be implemented by a combination of software components (e.g., executed by a DSP or a general processor) and hardware components (e.g., logic gates and circuitry) within the processor(s) 1938.

The transmission gap module 1946 may be used for various aspects of the present disclosure, for example, aspects of FIGS. 5, 6, 13, 14, and 15. The transmission gap module 1946 is configured to, for example, configure and handle transmission gaps in an NTN.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for indicating a transmission gap at a user equipment (UE) in a non-terrestrial network (NTN), the method comprising:
   decoding a physical uplink shared channel (PUSCH) aggregation factor associated with a distance to a serving satellite in the NTN, wherein the PUSCH aggregation factor indicates a total number of repetitions for uplink (UL) PUSCH transmissions;
   decoding a transmission gap information communication, the transmission gap information communication including at least information associated with a PUSCH transmission gap and a maximum number of repetitions before the PUSCH transmission gap, wherein the maximum number of repetitions before the PUSCH transmission gap is less than or equal to the total number of repetitions for the UL PUSCH transmissions; and
   encoding a number of the UL PUSCH transmissions equal to the maximum number of repetitions before occurrence of the PUSCH transmission gap.

2. The method of claim 1, wherein the PUSCH aggregation factor is semi-statically configured or dynamically indicated via time domain resource allocation (TDRA).

3. The method of claim 1, wherein the transmission gap information communication comprises downlink control information (DCI) and includes a length of the PUSCH transmission gap.

4. The method of claim 1, wherein the maximum number of repetitions before the PUSCH transmission gap is defined in terms of slots.

5. The method of claim 1, wherein the transmission gap information communication comprises a configuration of the PUSCH transmission gap, wherein the configuration of the PUSCH transmission gap is provided via a system information block (SIB), a radio resource control (RRC) configuration, or a medium access control (MAC) control element (CE).

6. The method of claim 5, wherein the configuration of the PUSCH transmission gap includes a length of the PUSCH transmission gap.

7. The method of claim 1, wherein the transmission gap information communication comprises a combination of downlink control information (DCI) and a time domain resource allocation (TDRA) table.

8. A method for performing repetitions with respect to a transmission gap at a user equipment (UE) in a non-terrestrial network (NTN), the method comprising:
   decoding a transmission gap information communication, the transmission gap information communication including at least information associated with a physical uplink shared channel (PUSCH) Type A transmission gap and a total number of repetitions, wherein each repetition corresponds to a single slot of a plurality of slots; and
   encoding a plurality of repetitions of uplink (UL) transmissions for transmission to the NTN, wherein one of the plurality of slots corresponding to the total number of repetitions given by the transmission gap information communication is occupied by the transmission gap and fewer than all of the total number of repetitions given by the transmission gap information communication is used for the plurality of repetitions of the UL transmissions.

9. The method of claim 8, wherein the transmission gap information communication further includes a maximum number of repetitions before the transmission gap.

10. The method of claim 9, wherein the plurality of repetitions of UL transmissions includes a subset of repetitions of UL transmissions equal to the maximum number of repetitions before the transmission gap occurring prior to the transmission gap.

11. A non-transitory computer-readable storage medium including instructions that when executed by a user equipment (UE) in a non-terrestrial network (NTN) cause the UE to:
   decode a physical uplink shared channel (PUSCH) aggregation factor associated with a distance to a serving satellite in the NTN, wherein the PUSCH aggregation factor indicates a total number of repetitions for uplink (UL) PUSCH transmissions;
   decode a transmission gap information communication, the transmission gap information communication including at least information associated with a PUSCH transmission gap and a maximum number of repetitions before the PUSCH transmission gap, wherein the maximum number of repetitions before the PUSCH transmission gap is less than or equal to the total number of repetitions for the UL PUSCH transmissions; and encode a number of the UL PUSCH transmissions equal to the maximum number of repetitions before occurrence of the PUSCH transmission gap.

12. The non-transitory computer readable storage medium of claim 11, wherein the PUSCH aggregation factor is semi-statically configured or dynamically indicated via time domain resource allocation (TDRA).

13. The non-transitory computer readable storage medium of claim 11, wherein the transmission gap information communication comprises downlink control information (DCI) and includes a length of the PUSCH transmission gap.

14. The non-transitory computer readable storage medium of claim 11, wherein the maximum number of repetitions before the PUSCH transmission gap is defined in terms of slots.

15. The non-transitory computer readable storage medium of claim 11, wherein the transmission gap information communication comprises a configuration of the PUSCH transmission gap, wherein the configuration of the PUSCH transmission gap is provided via a system information block (SIB), a radio resource control (RRC) configuration, or a medium access control (MAC) control element (CE).

16. The non-transitory computer readable storage medium of claim 15, wherein the configuration of the PUSCH transmission gap includes a length of the PUSCH transmission gap.

17. The non-transitory computer readable storage medium of claim 11, wherein the transmission gap information communication comprises a combination of downlink control information (DCI) and a time domain resource allocation (TDRA) table.

* * * * *